(12) United States Patent
Brunemann et al.

(10) Patent No.: US 6,725,847 B2
(45) Date of Patent: Apr. 27, 2004

(54) CONDENSATION PROTECTION AECD FOR AN INTERNAL COMBUSTION ENGINE EMPLOYING COOLED EGR

(75) Inventors: George Brunemann, Cincinnati, OH (US); Larry J. Brackney, Columbus, IN (US); Thomas A. Dollmeyer, Columbus, IN (US); B. Jerry Song, Columbus, IN (US); Michael G. Barbieri, Columbus, IN (US); Matthew M. Lipinski, Elizabeth Town, IN (US); Wayne Eberhard, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 44 days.

(21) Appl. No.: 10/120,051

(22) Filed: Apr. 10, 2002

(65) Prior Publication Data

US 2003/0192516 A1 Oct. 16, 2003

(51) Int. Cl.[7] .............................................. F02M 25/07
(52) U.S. Cl. .................. 123/568.12; 123/677; 60/605.2
(58) Field of Search .......................... 123/568.12, 677; 60/605.2

(56) References Cited

U.S. PATENT DOCUMENTS

| 4,961,413 | A | 10/1990 | Grey et al. |
|---|---|---|---|
| 4,964,318 | A | 10/1990 | Ganoung |
| 5,020,505 | A | 6/1991 | Grey et al. |
| 5,241,940 | A | 9/1993 | Gates, Jr. |
| 5,477,837 | A | 12/1995 | Ikebuchi |
| 5,617,726 | A | 4/1997 | Sheridan et al. |
| 5,732,688 | A | 3/1998 | Charlton et al. |
| 6,009,709 | A | 1/2000 | Bailey |
| 6,062,204 | A | 5/2000 | Cullen |
| 6,102,015 | A | 8/2000 | Tsuyuki et al. |
| 6,216,458 | B1 * | 4/2001 | Alger et al. ............... 60/605.2 |
| 2002/0011066 | A1 | 1/2002 | Takakura et al. |
| 2003/0114978 | A1 * | 6/2003 | Rimnac et al. ........ 123/568.12 |

* cited by examiner

Primary Examiner—Henry C. Yuen
Assistant Examiner—Arnold Castro
(74) Attorney, Agent, or Firm—Barnes & Thornburg

(57) ABSTRACT

A system for protecting an internal combustion engine employing cooled recirculated exhaust gas (EGR) from excessive condensation includes an auxiliary emission control device (AECD) operable to determine when engine operating conditions correspond to a condensing condition resulting in condensation of water at the outlet of the EGR cooler and/or within the intake manifold or intake conduit of the engine. When such conditions occur, the AECD is operable to close the EGR valve and monitor engine operating conditions. When engine operating conditions no longer correspond to the condensing condition, control of the EGR valve is restored to an air handling system associated with the engine.

18 Claims, 8 Drawing Sheets

CONDENSATION PROTECTION AECD FOR AN INTERNAL COMBUSTION ENGINE EMPLOYING COOLED EGR

FIELD OF THE INVENTION

The present invention relates generally to systems for controlling exhaust emissions produced by an internal combustion engine, and more specifically to such systems including an auxiliary emission control device for accommodating control of condensation effects resulting from cooled EGR.

BACKGROUND AND SUMMARY OF THE INVENTION

When combustion occurs in an environment with excess oxygen, peak combustion temperatures increase which leads to the formation of unwanted emissions, such as oxides of nitrogen ($NO_x$). This problem is aggravated through the use of turbocharger machinery operable to increase the mass of fresh air flow, and hence increase the concentrations of oxygen and nitrogen present in the combustion chamber when temperatures are high during or after the combustion event.

One known technique for reducing unwanted emissions such as $NO_x$ involves introducing chemically inert gases into the fresh air flow stream for subsequent combustion. By thusly reducing the oxygen concentration of the resulting charge to be combusted, the fuel burns slower and peak combustion temperatures are accordingly reduced, thereby lowering the production of $NO_x$. In an internal combustion engine environment, such chemically inert gases are readily abundant in the form of exhaust gases, and one known method for achieving the foregoing result is through the use of a so-called Exhaust Gas Recirculation (EGR) system operable to controllably introduce (i.e., recirculate) exhaust gas from the exhaust manifold into the fresh air stream flowing to the intake manifold valve, for controllably introducing exhaust gas to the intake manifold. Through the use of an on-board microprocessor, control of the EGR valve is typically accomplished as a function of information supplied by a number of engine operational sensors.

While EGR systems of the foregoing type are generally effective in reducing unwanted emissions resulting from the combustion process, a penalty may be paid for the use of EGR in the form of potentially damaging engine operating conditions. For example, when employing cooled EGR, exhaust containing condensation in the form of sulfuric acid and other components may collect at the EGR cooler outlet and in the air intake system of the engine. Excessive condensation may accordingly lead to engine corrosion and damage. A tradeoff thus exists in typical engine control strategies between acceptable levels of $NO_x$ production and safe (e.g., non-damaging) engine operating conditions, and difficulties associated with managing this tradeoff have been greatly exacerbated by the increasingly stringent requirements of government-mandated emission standards.

Historically, the Environmental Protection Agency (EPA) has promulgated limits for allowable levels of certain exhaust emissions such oxides of nitrogen (NOx). Recently, the EPA has recognized that mandated exhaust emission limits should allow engine behavior that deviates from expected engine operation under certain conditions, such as in order to avoid damaging or potentially damaging engine operating conditions. Deviation from expected engine operation, in this context, is generally allowable through the use of one or more so-called auxiliary emission control devices or AECDs. For purposes of the present invention an AECD is defined as a software structure that controls, as a function of one or more engine operating parameters, a current operational state of the engine.

The present invention is directed to a condensation protection AECD operable to control exhaust emissions in a manner that protects the engine from the formation of excessive condensation in an EGR cooler outlet and air intake system which may lead to formation therein of sulfuric acid and/or other corrosive compounds.

The present invention is further directed to such an AECD operable to estimate damage to each of the EGR cooler outlet and air intake structures resulting from allowed condensation conditions.

These and other objects of the present invention will become more apparent from the following description of the preferred embodiments.

DESCRIPTION OF THE PREFERRED EMBODIMENTS

Figure 1:
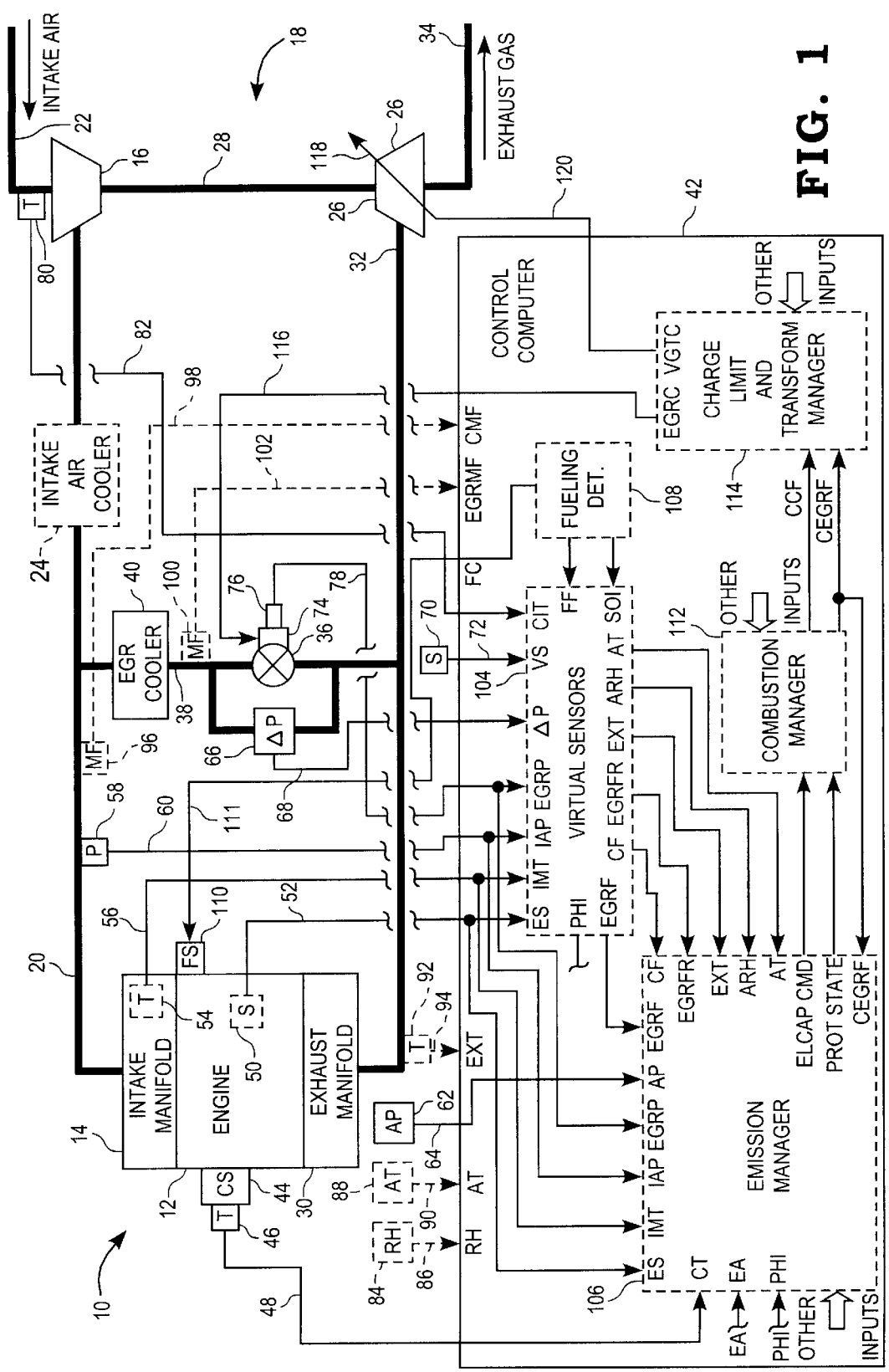
FIG. 1 is a diagrammatic illustration of one preferred embodiment of a system for controlling exhaust emissions produced an internal combustion engine employing cooled EGR including a condensation protection AECD, in accordance with the present invention.

For the purposes of promoting an understanding of the principles of the invention, reference will now be made to a number of preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Referring now to FIG. 1, one preferred embodiment of a system 10 for controlling exhaust emissions produced by an internal combustion engine 12, in accordance with the present invention, is shown. System 10 includes an internal combustion engine 12 having an intake manifold 14 fluidly coupled to a compressor 16 of a turbocharger 18 via intake conduit 20, wherein the compressor 16 receives fresh air via intake conduit 22. Optionally, as shown in phantom in FIG. 1, system 10 may include an intake air cooler 24 of known construction disposed in line with intake conduit 20 between the turbocharger compressor 16 and the intake manifold 14. The turbocharger compressor 16 is mechanically coupled to a turbocharger turbine 26 via drive shaft 28, wherein turbine 26 is fluidly coupled to an exhaust manifold 30 of engine 12 via exhaust conduit 32, and is further fluidly coupled to ambient via exhaust conduit 34. An EGR valve 36 or other suitable flow restriction mechanism is disposed in fluid communication with intake conduit 20 and exhaust conduit 32 via an EGR conduit 38, an EGR cooler 40 of known construction disposed in-line with EGR conduit 38 between EGR valve 36 and intake conduit 20. Although not shown in FIG. 1, EGR cooler 40 is, in one preferred embodiment, cooled via engine coolant circulating through a cooling system 44 associated with engine 12, in a manner well-known in the art, although the present invention contemplates cooling the EGR cooler 40 via other known cooling arrangements employing other known cooling fluids. In any case, those skilled in the art will recognize that "coolant temperature", as this term is used herein, generally refers to the temperature of the particular cooling system, or coolant fluid, used to cool the EGR cooler 40.

System 10 includes a control computer 42 that is preferably microprocessor-based and is generally operable to control and manage the overall operation of engine 12. Control computer 42 includes a memory unit (not shown) as well as a number of inputs and outputs for interfacing with various sensors and systems coupled to engine 12. Computer 42, in one embodiment, may be a known control unit sometimes referred to as an electronic or engine control module (ECM), electronic or engine control unit (ECU) or the like, or may alternatively be any control circuit capable of operation as described hereinafter.

In accordance with the present invention, control computer 42 includes a virtual sensor block 104 receiving a number of input signals and producing various estimated engine operating condition values as functions thereof, each in a manner to be more fully described hereinafter. Control computer 42 further includes a fueling determination block 108 responsive to a number of engine operating condition signals to compute a mass fuel flow rate (FF) value and a start-of-fuel injection timing value (SOI), and to determine a fueling command (FC) as a function thereof, in accordance with techniques well-known in the art. The fueling command, FC, determined by fueling determination block 108 is supplied to a fuel system 110 associated with engine 12 via signal path 111. Fuel system 110 is responsive to the fueling command, FC, produced by control computer 42 on signal path 111 to supply fuel to engine 12 in a manner well known in the art.

Control computer 42 further includes an emissions manager block 106 receiving a number of engine operating condition values from virtual sensor block 104, as well as a number of other input signals from engine operating condition sensors, and producing an emissions level cap command (ELCAP CMD) and a protection state data structure (PROT STATE) as functions thereof, each in a manner to be more fully described hereinafter.

Control computer 42 further includes a combustion manager block 112 receiving the ELCAP CMD value and PROT STATE data structure, and other input signals produced by various engine/vehicle operation sensors and/or sensing systems and/or other internally generated control values, and producing commanded charge flow (CCF) and commanded EGR fraction (CEGRF) values as functions thereof. In one embodiment, the combustion manager block 112 includes a control strategy operable to schedule charge flow and EGR fraction commands (CCF and CEGRF) as functions of one or more of the various input signals, and one such control strategy particularly suitable for use with the present invention is described in co-pending U.S. application Ser. No. 10/059,619, entitled SYSTEM FOR PRODUCING CHARGE FLOW AND EGR FRACTION COMMANDS BASED ON ENGINE OPERATING CONDITIONS, which is assigned to the assignee of the present invention, and the disclosure of which is incorporated herein by reference.

Control computer 42 further includes a charge limit and transform manager block 114 receiving the commanded charge flow (CCF) and commanded EGR fraction (CEGRF) values from the combustion manager block 112 as well as other input signals produced by various engine/vehicle operation sensors and/or sensing systems and/or other internally generated control values, and producing a number of EGR system/turbocharger control signals as functions thereof for controlling EGR flow and/or turbocharger swallowing capacity/efficiency. For example, an EGR control output (EGRC) of charge limit and transform manager 114 is electrically connected to an actuator 74 of EGR valve 36 via signal path 116, wherein the EGR valve actuator 74 is responsive to the EGR control signal, EGRC, on signal path 116 to establish a corresponding position of EGR valve 36, and hence a desired cross-sectional flow area therethrough. A variable geometry turbocharger control output (VGTC) of charge limit and transform manager block 114 is electrically connected to a variable geometry (VG) turbocharger actuating mechanism, shown generally at 118, via signal path 120, wherein the turbocharger actuating mechanism includes an actuator for modulating the flow geometry (swallowing capacity) and/or swallowing efficiency of the turbocharger turbine 26.

The term "turbocharger swallowing capacity" is defined for purposes of the present invention as the exhaust gas flow capacity of the turbocharger turbine 26, and the term "turbocharger swallowing efficiency" refers to the ability of the turbocharger turbine 26 to process the flow of exhaust gas exiting the exhaust manifold 30. System 10 may include any one or more of a number of air handling mechanisms for controlling turbocharger swallowing capacity and/or efficiency, and any such mechanisms are illustrated generally in FIG. 1 as a variable geometry turbocharger turbine (VGT) 118 electrically connected to the VGTC output of control computer 42 via signal path 120. One example turbocharger swallowing capacity control mechanism that may be included within system 10 is a known electronically controllable variable geometry turbocharger turbine 26. In this regard, turbine 26 includes a variable geometry turbocharger actuator (not shown) electrically connected to signal path 120. In this embodiment, control computer 42 is operable to produce a variable geometry turbocharger control signal on signal path 120, and the variable geometry turbocharger actuator is responsive to this control signal to control the swallowing capacity (i.e., exhaust gas flow capacity) of turbine 26 by controlling the flow geometry of turbine 26 in a known manner.

Another example turbocharger swallowing capacity control mechanism that may be included within system 10 is a known electrically controllable exhaust throttle (not shown) having an exhaust throttle actuator (not shown) electrically connected to signal path 120. In this embodiment, the exhaust throttle is disposed in-line with exhaust conduit 34 or exhaust conduit 32, and control computer 42 is operable to produce an exhaust throttle control signal on signal path 120. The exhaust throttle actuator is responsive to this control signal to control the position of the exhaust throttle relative to a reference position. The position of the exhaust throttle defines a cross-sectional flow area therethrough, and by controlling the cross-sectional flow area of the exhaust throttle, control computer 42 is operable to control the flow rate of exhaust gas produced by engine 12, and thus the swallowing capacity (i.e., exhaust gas flow capacity) of turbine 26.

One turbocharger swallowing efficiency control mechanism that may be included within system 10 is a known electronically controllable wastegate valve (not shown) having a wastegate valve actuator (not shown) electrically connected to signal path 120. The wastegate valve has an inlet fluidly coupled to exhaust conduit 32, and an outlet fluidly coupled to exhaust conduit 34, and control computer 42 is operable to produce a wastegate valve control signal on signal path 120. The wastegate valve actuator is responsive to this control signal to control the position of the wastegate valve relative to a reference position. The position of the wastegate valve defines a cross-sectional flow area therethrough, and by controlling the cross-sectional flow area of the wastegate valve, control computer 42 is operable to selectively divert exhaust gas away from turbine 26, and thereby control the swallowing efficiency of turbine 26.

It is to be understood that while FIG. 1 is illustrated as including only a general turbocharger swallowing capacity/efficiency control mechanism 120, the present invention contemplates embodiments of system 10 that include any single one, or any combination, of the foregoing example turbocharger air handling control mechanisms. Additionally, control computer 42 may be configured in a known manner to control any one or combination of such example turbocharger air handling control mechanisms to thereby control turbocharger swallowing capacity and/or efficiency.

In any case, example control strategies particularly suitable for use within the charge limit and transform manager block 114 of the present invention to perform the functions described are set forth in co-pending U.S. application Ser. No. 09/773,151, entitled SYSTEM FOR MANAGING CHARGE FLOW AND EGR FRACTION IN AN INTERNAL COMBUSTION ENGINE, and co-pending U.S. application Ser. No. 09/773,654, entitled SYSTEM FOR DECOUPLING EGR FLOW AND TURBOCHARGER SWALLOWING CAPACITY/EFFICIENCY CONTROL MECHANISMS, both of which are assigned to the assignee of the present invention, and the disclosures of which are each incorporated herein by reference.

System 10 further includes a number of sensors and/or sensing systems for providing the control computer 42 with information relating to the operation of engine 12. For example, engine 12 includes a cooling system 44 circulating cooling fluid through engine 12 and EGR cooler 40 in a known manner, wherein cooling system 44 includes a coolant temperature sensor 46 in fluid communication therewith. Sensor 46 is of known construction and is electrically connected to a coolant temperature input, CT, of the emission manager block 106 of control computer 42 via signal path 48. Coolant temperature sensor 46 is operable to produce a temperature signal on signal path 46 indicative of the temperature of coolant fluid circulating through engine 12 and EGR cooler 40, which is accordingly indicative of an operating temperature of engine 12 and EGR cooler 40.

System 10 further includes an engine speed sensor 50 electrically connected to an engine speed input, ES, of the virtual sensors block 104 and emission manager block 106 of control computer 42 via signal path 52. Engine speed sensor 50 is operable to sense rotational speed of the engine 12 and produce an engine speed signal on signal path 52 indicative of engine rotational speed. In one embodiment, sensor 50 is a Hall effect sensor operable to determine engine speed by sensing passage thereby of a number of equi-angularly spaced teeth formed on a gear or tone wheel. Alternatively, engine speed sensor 50 may be any other known sensor operable as just described including, but not limited to, a variable reluctance sensor or the like.

System 10 further includes an intake manifold temperature sensor 54 disposed in fluid communication with the intake manifold 14 of engine 12, and electrically connected to an intake manifold temperature input, IMT, of the virtual sensors block 104 and emission manager block 106 of control computer 42 via signal path 56. Intake manifold temperature sensor 54 may be of known construction, and is operable to produce a temperature signal on signal path 56 indicative of the temperature of air charge flowing into the intake manifold 14, wherein the air charge flowing into the intake manifold 14 is generally made up of fresh air supplied by the turbocharger compressor 16 combined with recirculated exhaust gas supplied by EGR valve 36.

System 10 further includes a pressure sensor 58 disposed in fluid communication with intake conduit 20 and electrically connected to an intake air pressure input (IAP) of the virtual sensors block 104 and emission manager block 106 of control computer 42 via signal path 60. Alternatively, pressure sensor 58 may be disposed in fluid communication with the intake manifold 14. In any case, pressure sensor 58 may be of known construction, and is operable to produce a pressure signal on signal path 60 indicative of intake air pressure within intake conduit 20 and intake manifold 14. Pressure sensor 58 may sometimes referred to in the art as a so-called "boost pressure" sensor because it is operable to sense changes in pressure (i.e., "boost" pressure) within conduit 20 and intake manifold 14 resulting from the operation of turbocharger 18. Alternatively, pressure sensor 58 may sometimes be referred to in the art as an intake manifold pressure sensor, compressor outlet pressure sensor, or "charge pressure sensor", and for purposes of the present invention, the terms "intake air pressure", "boost pressure", intake manifold pressure", "compressor outlet pressure" and "charge pressure" are considered to by synonymous.

System 10 further includes an ambient pressure sensor 62 suitably disposed relative to engine 12 and electrically connected to an ambient pressure input, AP, of the emission manager block 106 of control computer 42 via signal path 64. Pressure sensor 62 may be on known construction and is operable to produce a pressure signal on signal path 64 indicative of ambient air pressure.

System 10 further includes a differential pressure sensor, or ΔP sensor, 66 fluidly coupled at one end to EGR conduit 38 adjacent to an exhaust gas inlet of EGR valve 36, and fluidly coupled at its opposite end to EGR conduit adjacent to an exhaust gas outlet of EGR valve 36. Alternatively, the ΔP sensor 66 may be coupled across another flow restriction mechanism disposed in-line with EGR conduit 38. In any case, the ΔP sensor 66 may be of known construction and is electrically connected to a ΔP input of the virtual sensors block 106 of control computer 42 via signal path 68. The ΔP sensor 66 is operable to provide a differential pressure signal on signal path 68 indicative of the pressure differential across EGR valve 36 or other flow restriction mechanism disposed in-line with EGR conduit 38.

System 10 further includes a vehicle speed sensor 70 suitably disposed relative to a vehicle driven by engine 12 and electrically connected to a vehicle speed input, VS, of the virtual sensors block 104 of control computer 42 via signal path 72. In one embodiment, sensor 70 is a variable reluctance sensor disposed about a tailshaft (not shown) of the vehicle driven by engine 12. Alternatively, sensor 70 may be a known wheel speed sensor suitably disposed relative to a vehicle wheel driven by engine 12. It is to be understood, however, that the present invention contemplates that sensor 70 may be any known sensor operable to produce a speed signal on signal path 72 indicative of road speed of the vehicle driven by engine 12.

System 10 further includes an EGR valve position sensor 76 electrically connected to an EGR valve position input, EGRP, of the virtual sensors block 104 and the emission manager block 106 of control computer 42 via signal path 78. Position sensor 76 may be of known construction and is operable to produce a position signal on signal path 78 indicative of the position of the EGR valve actuator 74 relative to a reference position System 10 further includes a compressor inlet temperature sensor 80 that is preferably disposed in fluid communication with intake conduit 22 and electrically connected to a compressor inlet temperature input, CIT, of the virtual sensors block 104 of control computer 42 via signal path 82. Temperature sensor 80 may be of known construction and is generally operable to produce a compressor inlet temperature signal on signal path 82 indicative of the temperature of ambient air entering the inlet of compressor 16 (i.e., entering the intake conduit 22). It is to be understood, however, that for the purposes of the present invention, sensor 80 need not be disposed in fluid communication with intake conduit 22 and may instead be positioned in any convenient location relative to system 10 as long as sensor 80 is operable to produce a signal on signal path 82 indicative of the temperature of ambient air. For example, system 10 may optionally (i.e., alternatively or additionally) include an ambient temperature sensor 88 suitably disposed relative to a vehicle driven by engine 12 and electrically connected to an ambient temperature input, AT, of control computer 42 via signal path 90, as shown in phantom in FIG. 1. Sensor 88 may be of known construction and is operable to produce a temperature signal on signal path 90 indicative of the temperature of ambient air. The temperature signal on signal path 90 may be used by the virtual sensors block 104, emission manager block 106 and/or any other control strategy implemented by control computer 42.

Optionally, as shown in phantom in FIG. 1, system 10 may further include a relative humidity sensor 84 suitably disposed relative to a vehicle driven by engine 12 and electrically connected to a relative humidity input, RH, of control computer 42 via signal path 86. Sensor 84 is of known construction and is operable to produce a relative humidity signal on signal path 86 indicative of the relative humidity level of ambient air. The relative humidity signal on signal path 86 may be used by the virtual sensors block 104, emission manager block 106 and/or any other control strategy implemented by control computer 42.

System 10 may further optionally include an engine exhaust temperature sensor 92 disposed in fluid communication with exhaust conduit 32 and electrically connected to an engine exhaust temperature input (EXT) of control computer 42 via signal path 94, as shown in phantom in FIG. 1. Alternatively, temperature sensor 92 may be disposed in fluid communication with exhaust manifold 30. In any case, sensor 92 may be of known construction, and is operable to produce a temperature signal on signal path 94 indicative of the temperature of exhaust gas produced by engine 12. The temperature signal on signal path 94 may be used by the virtual sensors block 104, emission manager block 106 and/or any other control strategy implemented by control computer 42.

System 10 may further optionally include a first mass airflow sensor 96 disposed in fluid communication with intake conduit 20 and electrically connected to a charge mass flow rate input (CMF) of control computer 42 via signal path 98, as shown in phantom in FIG. 1. Sensor 96, in this embodiment, is located downstream of the junction of intake conduit 20 with the EGR conduit 38, and may be disposed in fluid communication with intake conduit 20 as illustrated in FIG. 1, or may alternatively be disposed in fluid communication with intake manifold 14. In either case, sensor 96 is operable to produce a mass airflow signal on signal path 98 indicative of the mass flow rate of air charge entering the intake manifold 14, wherein the term "air charge" is defined for purposes of the present invention as a mixture of fresh air supplied by the turbocharger compressor 16 and recirculated exhaust gas supplied by EGR conduit 38. Although not illustrated in FIG. 1, those skilled in the art will recognize that sensor 96 may alternatively or additionally be disposed in fluid communication with intake conduit 20 upstream of the junction of intake conduit 20 and EGR conduit 38, or in fluid communication with intake conduit 22, and in this embodiment sensor 96 is operable to produce a mass airflow signal indicative of the mass flow rate of fresh air supplied to intake conduit 20 by the turbocharger compressor 16.

System 10 may further optionally include a second mass airflow sensor 100 disposed in fluid communication with EGR conduit 38 and electrically connected to an EGR mass flow rate input (EGRMF) of control computer 42 via signal path 102, as shown in phantom in FIG. 1. Sensor 100 may be located on either side of the EGR valve 36, and in any case, mass airflow sensor 100 may be of known construction and operable to produce a mass airflow signal on signal path 102 indicative of the mass flow rate of recirculated exhaust gas flowing through the EGR conduit 38.

The virtual sensors block 104 is operable to estimate a number of engine operating conditions, each as functions of a number of sensor signals supplied to block 104 and/or other estimated engine operating condition values. For example, in one embodiment, block 104 includes a known algorithm for estimating charge flow rate (i.e., the mass flow rate of air charge entering the intake manifold 14), CF, wherein block 104 is operable to supply the charge flow value, CF, to a charge flow rate input, CF, of the emission manager block 106. In one preferred embodiment, the virtual sensors block 104 is operable to compute an estimate of charge flow, CF, by first estimating the volumetric efficiency ($\eta_v$) of the charge intake system, and then computing CF as a function of $\eta_v$ using a conventional speed/density equation. Any known technique for estimating $\eta_v$ may be used, and in one preferred embodiment of block 104, $\eta_v$ is computed according to a known Taylor mach number-based volumetric efficiency equation given as:

$$\eta_v = A_1 * \{(Bore/D)^2 * (stroke * ES)^B / sqrt(\gamma * R * IMT) * [(1+EP/IAP) + A_2]\} + A_3 \quad (1),$$

where, $A_1$, $A_2$, $A_3$ and B are all calibratable parameters preferably fit to the volumetric efficiency equation based on mapped engine data,
Bore is the intake valve bore length,
D is the intake valve diameter,
stroke is the piston stroke length, wherein Bore, D and stroke are generally dependent upon engine geometry,
$\gamma$ and R are known constants (e.g., $\gamma * R = 387.414$ KJ/kg/deg K),
ES is engine speed,
IAP is the intake air pressure,
EP is the exhaust pressure, where EP=IAP+$\Delta$P, and
IMT=intake manifold temperature.

With the volumetric efficiency value $\eta_v$ estimated according to the foregoing equation, the charge flow value, CF, is preferably computed according to the equation:

$$CF = \eta_V * V_{DIS} * ESP * IAP / (2 * R * IMT) \quad (2),$$

where, $\eta_V$ is the estimated volumetric efficiency,
$V_{DIS}$ is engine displacement and is generally dependent upon engine geometry,
ES is engine speed,
IAP is the intake air pressure,
R is a known gas constant (e.g., R=54), and
IMT is the intake manifold temperature.

In an alternative embodiment, system 10 may include a charge mass flow rate sensor 96, and control computer 42 is operable in this embodiment to obtain the charge flow rate information directly from sensor 96.

The virtual sensor block 104, in one embodiment, further includes an algorithm for estimating the temperature of exhaust gas, EXT, produced by engine 12, wherein block 104 is operable to supply the exhaust gas temperature value, EXT, to an engine exhaust temperature input, EXT, of the emission manager block 106. In one preferred embodiment, the virtual sensors block 104 is operable to compute the engine exhaust temperature estimate, EXT, according to the model:

$$EXT = IMT + A + (B * SOI) + C / (CF/FF) + (D * SOI) / ES + E / [(ES * CF) / FF(\beta)],$$

where,

IMT is the intake manifold temperature,
SOI is the start of injection value produced by the fueling determination block 108,
FF is the fuel flow rate value produced by the fueling determination block 108,
CF is the charge flow rate value described hereinabove,
ES is engine speed, and
A, B, C, D and E are model constants.

In an alternate embodiment, block 104 is operable to compute the engine exhaust temperature estimate, EXT, according to the model:

$$EXT = IMT + [(A*ES) + (B*IAP) + (C*SOI) + D][(LHV*FF)/CF] \quad (4),$$

where,

IMT is the intake manifold temperature,
SOI is the start of injection value produced by the fueling determination block 108,
FF is the fuel flow rate value produced by the fueling determination block 108,
IAP is the air intake pressure value defined hereinabove,
ES is engine speed,
LHV is a lower heating value of the fuel, which is a known constant depending upon the type of fuel used by engine 12, and
A, B, C, and D are model constants.

Further details relating to either of the engine exhaust temperature models represented by equations (3) and (4) are provided in co-pending U.S. patent application Ser. No. 09/774,664, entitled SYSTEM FOR ESTIMATING ENGINE EXHAUST TEMPERATURE, which is assigned to the assignee of the present invention, and the disclosure of which is incorporated herein by reference. In another alternate embodiment, system 10 may include an exhaust temperature sensor 92, and control computer 42 is operable in this embodiment to obtain the engine exhaust temperature information directly from sensor 92.

The virtual sensor block 104, in one embodiment, further includes an algorithm for estimating the EGR flow rate (i.e., the mass flow rate of recirculated exhaust gas through EGR conduit 38), EGRF, and EGR fraction (i.e., the fraction of total air charge entering the intake manifold that is recirculated exhaust gas), EGRFR, wherein block 104 is operable to supply the EGR flow value, EGRF, to a EGR flow rate input, EGRF, of the emission manager block 106, and to supply the EGR fraction value, EGRFR, to an EGR fraction input, EGRFR, of the emission manager block 106. In one preferred embodiment, the virtual sensors block 104 is operable to compute the EGR flow rate estimate, EGRF, according to the model:

$$EGRF = EFA * sqrt[|(2 * \Delta P * IAP)/(R*EXT)|] \quad (5),$$

where,

EFA is the effective flow rate of fluid through exhaust conduit 38, and is generally a function of the EGR valve position signal, EGRP, ΔP is the pressure differential across EGR valve 36 or other flow restriction device disposed in-line with EGR conduit 38,
IAP is the intake air pressure value defined hereinabove,
EXT is the engine exhaust temperature, and
R is a known gas constant (e.g., R=54).

In this embodiment, block 104 is operable to determine the EGR fraction as a ratio of EGR flow rate, EGRF, and charge flow rate, CF. It is to be understood that equation (5), as well as the computation of the EGR fraction value, EGRFR, just described represent simplified approximations of these two parameters based on assumptions of constant exhaust gas temperature through the EGR valve 36 and steady state flow of exhaust gas through EGR valve 36, and neglecting effects resulting from a variable time delay between the passage of recirculated exhaust gas through EGR valve 36 and arrival of the corresponding EGR fraction in the engine cylinders. Further details relating to strategies for addressing such assumptions are described in co-pending U.S. patent application Ser. No. 09/774,897, entitled SYSTEM AND METHOD FOR ESTIMATING EGR MASS FLOW AND EGR FRACTION, which is assigned to the assignee of the present invention, and the disclosure of which is incorporated herein by reference. In an alternative embodiment, system 10 may include an EGR mass flow rate sensor 100, and control computer 42 is operable in this embodiment to obtain the EGR flow rate information directly from sensor 100.

The virtual sensors block 104, in one embodiment, further includes an algorithm operable to estimate ambient temperature, AT, as a known function of the compressor inlet temperature signal, CIT, vehicle speed signal, VS, and fresh air flow rate. Block 104 is operable to determine fresh air flow rate as a difference between the charge flow estimate, CF, and the EGR flow estimate, EGRF, as a difference between the mass air flow rate signals provided by the optional charge mass air flow sensor 96 and the optional EGR mass flow sensor 100, or directly from an optional fresh mass airflow sensor as described above. Alternatively, system 10 may include an ambient air temperature sensor 88, and control computer 42 is operable in this embodiment to obtain the ambient air temperature information directly from sensor 88. In any case, the ambient air temperature value, AT, is supplied to an ambient air temperature input, AT, of the emission manager block 106.

The virtual sensors block 104, in one embodiment, is further operable to provide an ambient relative humidity value, ARH, to an ambient relative humidity input, ARH, of the emission manager block 106. In one embodiment, block 104 is operable to set ARH to a predefined constant value for all engine operating conditions. Alternatively, block 104 may be operable to estimate ARH as a function of one or more engine operating conditions in accordance with a known ambient relative humidity estimation algorithm. In another alternative embodiment, system 10 may include a relative humidity sensor 84 providing a relative humidity signal, RH, to control computer 42, wherein control computer 42 is operable to determine ambient relative humidity information directly from sensor 84 and supply such information to the ARH input of emission manager block 106.

The virtual sensors block 104, in one embodiment, further includes an algorithm operable to estimate a flow ratio parameter, PHI, as a known ratio of the fuel mass flow value, FF, provided by the fueling determination block 108 and fresh air flow rate, wherein block 104 is operable to determine fresh air flow rate in accordance with one or more of the techniques described hereinabove.

The emission manager 106 is further operable to receive a commanded EGR fraction value, CEGRF, from the combustion manager block 112, an engine active value, EA, generated internally to control computer 42, wherein EA is indicative of an operating state of engine 12 (e.g., set to a high logic state if the engine 12 is running and otherwise set to a low logic state), and a number of other input signals/values generated internally to control computer 42 and/or provided by other sensors or sensing systems associated with system 10.

Figure 2:
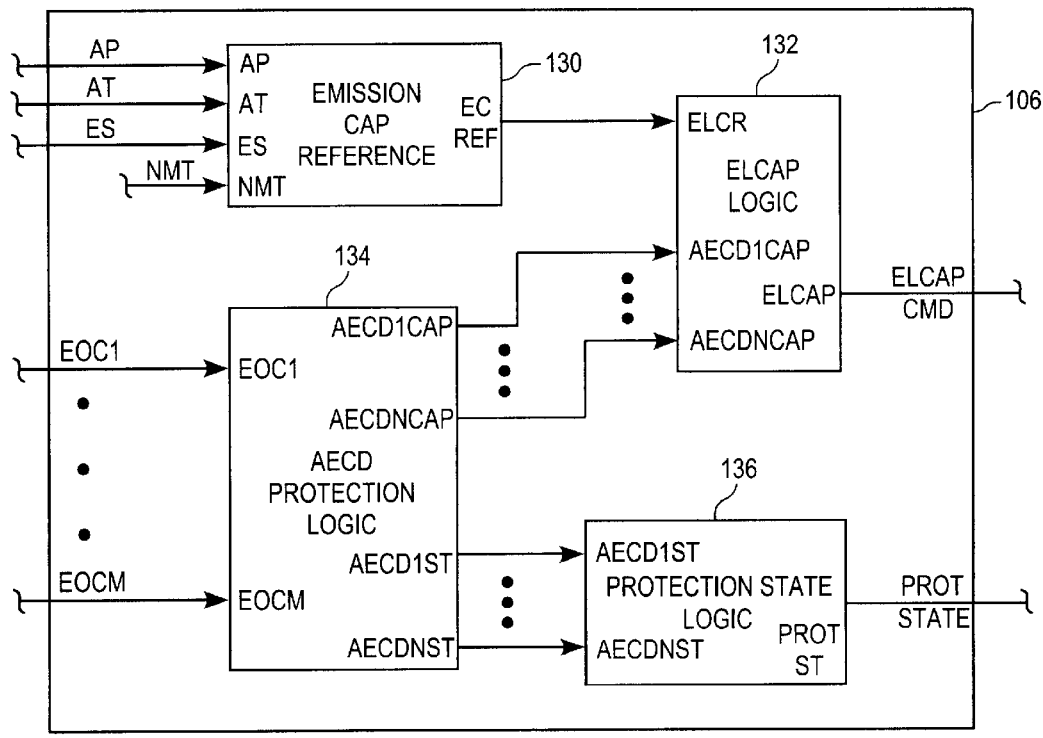
FIG. 2 is a diagrammatic illustration of one known embodiment of at least a portion of the emission manager block of the control computer illustrated in FIG. 1.
Figure 3:
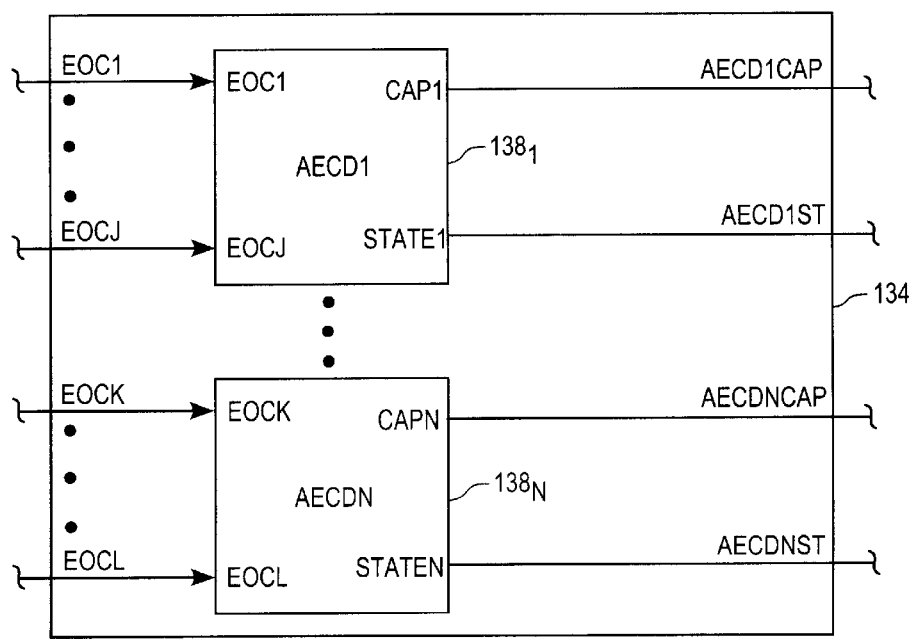
FIG. 3 is a diagrammatic illustration of one known embodiment of at least a portion of the AECD protection logic block illustrated in FIG. 2.

Referring now to FIGS. 2 and 3, one preferred embodiment of the internal structure of the emission manager block 106 of the control computer 42 is shown. In the embodiment shown, the emission manager 106 includes an emission cap reference block 130 receiving as inputs the ambient pressure signal, AP, on signal path 64, the engine speed signal, ES, on signal path 52, the ambient temperature value, AT, provided by the virtual sensors block 104 (or provided by optional ambient temperature sensor 88) and a net motor torque value, NMT, determined internally to block 106. The emission cap reference block 130 is operable to process the various input signals and produce as an output an emission cap reference value, EC REF, corresponding to a maximum allowable emissions level to be produced by engine 12 based on present altitude (ambient pressure) and ambient temperature conditions as well as on a ratio of engine speed and load.

Emission manager block 106 further includes an AECD protection logic block 134 receiving as inputs a number, M, of engine operating condition signals/values EOC1-EOCM, wherein M may be any positive integer. The AECD protection logic block 134 includes a number, N, of AECDs $138_1$–$138_N$, as illustrated in FIG. 3, wherein N may be any positive integer. Each AECD $138_X$ within block 134 may receive as inputs any number of engine operating condition signals/values, and any one engine operating condition signal/value may be provided as an input to any one or more AECDs. For example, AECD1 of FIG. 3 is illustrated as receiving a number, J, of engine operating conditions signals/values EOC1–EOCJ, and AECDN of FIG. 3 is illustrated as receiving a number, L-K, of engine operating condition signals/values EOCK–EOCL, wherein J, L and K may be any positive integer with L>K. Each AECD included within the AECD protection logic block 134 is operable to process the various input signals thereto and produce as a first output a corresponding emission level cap value and as a second output an AECD state value. For example, as illustrated in FIG. 3, AECD1 is operable to produce an AECD emission cap value, CAP1, and an AECD state value, STATE1, and AECDN is operable to produce an AECD emission cap value, CAPN, and an AECD state value, STATEN, wherein all "N" such values are provided as outputs of the AECD protection logic block 134 in the form of AECD emission cap values, AECD1CAP–AECDNCAP and AECD state values, AECD1ST–AECDNST. Generally, the emission cap values, CAP1–CAPN, produced by the various AECDs $138_1$–$138_N$ represent maximum allowable emission level values based on the operation thereof, and the AECD state values, STATE1–STATEN represent operational statuses of the various AECDs $138_1$–$138_N$ (e.g., active or inactive).

The emission level cap reference value, EC REF, produced by the emission cap reference block 130, as well as the various AECD emission cap values, AECD1CAP–AECDNCAP, are provided as inputs to an EL CAP logic block 132. In one embodiment, the EL CAP logic block 132 is operable to produce as an emission level cap command value, ELCAP, the maximum value of the various emission level cap level inputs thereto, wherein ELCAP represents the final emission level cap command value, ELCAP CMD, produced by the emission manager block 106. The various AECD state values, AECD1ST–AECDNST, are provided as inputs to a protection state logic block 136 operable to produce a protection state output, PROT ST, indicative of the operational statuses of one or more of the AECDs included within block 134. In one embodiment, PROT ST represents a data structure including information indicative of the operational statuses of each of the AECDs, AECD1–AECDN, included within block 134, wherein PROT ST represents the final AECD protection state data structure, PROT STATE, produced by the emission manager block 106. The combustion manager block 112 is responsive to the final emission level cap command value, ELCAP CMD, as well as the final protection state data structure, PROT STATE, produced by the emission manager 106 to compute corresponding charge flow and EGR flow commands, CCF and CEGRF respectively, and the charge limit and transform manager block 114 is operable to control the various air handling mechanisms of system 10 as functions thereof such that emissions produced by the engine 12 are limited by the ELCAP CMD value and/or the protection state data structure, PROT STATE. Further details relating to the general structure of the emission manager block 106 shown and described with respect to FIGS. 2 and 3 are provided in co-pending U.S. patent application Ser. No. 10/059,505, entitled SYSTEM FOR CONTROLLING EXHAUST EMISSIONS PRODUCED BY AN INTERNAL COMBUSTION ENGINE, which is assigned to the assignee of the present invention, and the disclosure of which is incorporated herein by reference.

The one or more AECDs $138_1$–$138_N$ included within the emission manager 106 are operable, when active, to provide some relief in the emission level cap command, ELCAP CMD, produced by the emission manager 106 for specific purposes. Accordingly, the one or more AECD emission cap values, AECD1CAP–AECDNCAP, generally represent emission level cap values that are higher than the emission level cap reference value EC REF, so that the final emission level cap command value, ELCAP CMD, is correspondingly higher than EC REF when any one or more of the AECDs $138_1$–$138_N$ are active, thus allowing the engine 12 to operate with higher emission levels than when no AECDs are active. Additionally or alternatively, active values of one or more of the protection state values, STATE1–STATEN, may be used by the combustion manager block 112 to close the EGR valve 36 under certain circumstances, thereby discontinuing the flow of recirculated exhaust gas to engine 12.

In accordance with the present invention, a condensation protection AECD is provided as a "Jth" one ($138_J$) of the AECDs $138_1$–$138_N$ which, when active, produces an emission level cap value, CAPJ, that is greater than the emission level cap reference value, EC REF. Additionally, AECD $138_J$ of the present invention is further operable to produce an AECD state value, STATEJ, which, when active, causes the combustion manager block 112 to command the EGR valve 36 closed to thereby discontinue for some time period the flow of recirculated exhaust gas to engine 12.

Figure 4:
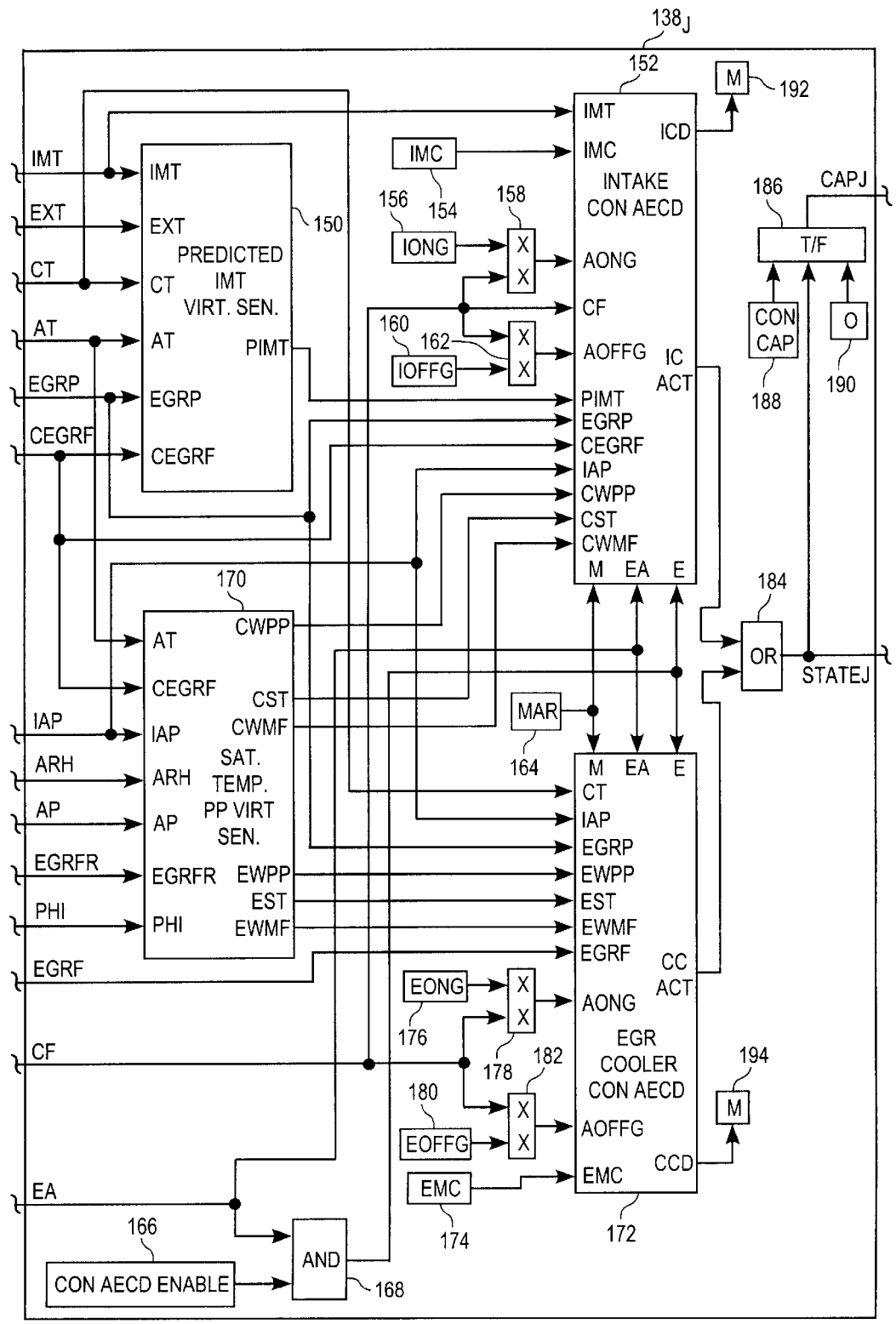
FIG. 4 is a diagrammatic illustration of one preferred embodiment of one of the AECDs illustrated in FIG. 3 for providing condensation protection resulting from the use of cooled EGR, in accordance with the present invention.

Referring now to FIG. 4, one preferred embodiment of the condensation protection AECD $138_J$ in accordance with the present invention, is shown. The condensation AECD $138_J$ includes a predicted intake manifold temperature virtual sensor block 150 receiving as inputs the intake manifold temperature value, IMT, the engine exhaust temperature value, EXT, the coolant temperature value, CT, the ambient temperature value, AT, the EGR valve position value, EGRP, and the commanded EGR fraction value, CEGRF. Virtual sensor block 150 is operable to process the foregoing input signals and produce as an output a predicted intake manifold temperature value, PIMT, as will be described in greater detail hereinafter.

Condensation AECD $138_J$ further includes a saturation temperature and partial pressure virtual sensor block 170 receiving as inputs the ambient temperature value, AT, the commanded EGR fraction value, CEGRF, the intake air pressure value, IAP, the ambient relative humidity value, ARH, the ambient pressure value, AP, the EGR fraction value, EGRFR, and the fuel/air flow ratio value, PHI. As will be described in greater detail hereinafter, the condensation AECD $138_J$ requires an estimate of the water content in fresh air, exhaust gas and air charge, and in this regard, virtual sensor block 170 is operable to produce as output values a charge water partial pressure value, CWPP, a charge water mole fraction value, CWMF, an exhaust water partial pressure value, EWPP, and an exhaust water mole fraction value, EWMF. The condensation AECD $138_J$ further requires an estimate of the charge saturation temperature and exhaust saturation temperature and in this regard virtual sensor block 170 is operable to produce as outputs a charge saturation temperature value, CST, and an exhaust saturation temperature value, EST.

Condensation AECD $138_J$ further includes an intake condensation AECD 152 receiving as inputs the intake manifold temperature value, IMT, the EGR valve position value, EGRP, the commanded EGR fraction value, CEGRF, the intake air pressure value, IAP, the predicted intake manifold temperature value, PIMT, produced by virtual sensor block 150, and the charge water partial pressure value, CWPP, the charge saturation temperature value, CST, and the charge water mole fraction value, CWMF, produced by virtual sensor block 170. Intake condensation AECD 152 further includes an intake maximum count input, IMC, receiving an intake maximum count value, IMC, from block 154. An intake "on" gain block 156 contains an intake "on" gain value, IONG, which is provided to a first input of a multiplication block 158 having a second input receiving the charge flow value, CF. An intake "off" gain block 160 contains an intake "off" gain value, IOFFG, which is provided to a first input of a second multiplication block 162 having a second input receiving the charge flow value, CF. The intake condensation AECD 152 includes an adjusted "on" gain input, AONG, receiving the output of multiplication block 158, an adjusted "off" gain input, AOFFG, receiving the output of multiplication block 162, and a charge flow input, CF, receiving the charge flow value, CF.

The ratio of AONG to AOFFG of the intake condensation AECD 152 controls how fast AECD 152 turns on relative to how fast AECD 152 turns off. The intake maximum count value, IMC, defines the size of count (i.e., delay) prior to activating AECD 152. The primary purpose of the foregoing maximum count and gain logic is to provide some hysteresis to prevent the AECD 152 from cycling on and off when the operation of engine 12 is rapidly switching between condensing and non-condensing operational states. In one embodiment of the condensation AECD $138_J$, short periods of condensation are not considered to present a significant risk to the safe operation of engine 12, and are accordingly permitted.

Condensation AECD $138_J$ further includes an EGR cooler condensation AECD 172 receiving as inputs the coolant temperature value, CT, the intake air pressure value, IAP, the EGR valve position value, EGRP, the EGR flow value, EGRF, and the exhaust water partial pressure value, EWPP, the exhaust saturation temperature value, EST, and the exhaust water mole fraction value, EWMF, produced by virtual sensor block 170. An EGR cooler maximum count block 174 contains an EGR cooler maximum count value, EMC, which is provided to an EGR cooler maximum count input, EMC, of AECD 172. An exhaust "on" gain block 176 provides an exhaust "on" and gain value, EONG, to a first input of a multiplication block 178 having a second input receiving the charge flow value, CF. An exhaust "off" gain block 180 contains an exhaust "off" gain value, EOFFG, which is provided to a first input of a second multiplication block 182 having a second input receiving the charge flow value, CF. The EGR cooler condensation AECD 172 has an adjusted "on" gain input, AONG, receiving the output of multiplication block 178, and an adjusted "off" gain input, AOFFG, receiving the output of multiplication block 182. The maximum count and gain values associated with the EGR cooler condensation AECD 172 function identically to the corresponding maximum count and gain values associated with the intake condensation AECD 152 described hereinabove.

Each of the intake condensation AECD 152 and EGR cooler condensation AECD 172 include a margin input, M, receiving a condensation margin value, MAR, from margin block 164. The condensation margin, MAR, defines how close engine operation must be to a condensation condition to be considered in a condensation active state. For example, if calculations indicate that the predicted intake manifold temperature, PIMT, is currently within 3 degrees of a condensation condition, a margin value, MAR, of 5 would indicate that AECD 138$_J$ would consider the predicted intake manifold temperature, PIMT, to be 2 degrees past the condensation condition. The condensation margin value, MAR, accounts for errors introduced by noise in the sensors and uncertainties in the virtual sensor calculations.

Each of the intake condensation AECD 152 and the EGR cooler condensation AECD 172 further include an engine active input, EA, receiving the engine active value, EA, and an enable input, E, connected to an output of AND block 168 having a first input receiving the engine active value, EA, and a second input receiving a condensation AECD enable value, CON AECD ENABLE, contained within a memory block 166. Generally, each of the AECDs 152 and 172 are enabled for operation whenever the condensation AECD enable value, CON AECD ENABLE, within block 166 is "true" and the engine is currently active (i.e., engine is running). The condensation AECD 138$_J$ may thus be selectively activated and deactivated, such as via a known service tool, by appropriately setting the condensation AECD enable value, CON AECD ENABLE, within block 166.

The intake condensation AECD 152 is operable to produce as an output an intake condensation active value, IC ACT, and the EGR cooler condensation AECD 172 is operable to produce as an output a cooler condensation active value, CC ACT, wherein each of these values is supplied to separate inputs of a two-input OR block 184. The output of OR block 184 defines the STATEJ output of AECD 138$_J$. The STATEJ output of OR block 184 is also supplied to a control input of a true/false block 186 receiving as a "false" input a constant value (e.g., zero) stored within block 190, and receiving as a "true" input a condensation emission level cap value, CON CAP, stored within block 188. The output of true/false block 186 defines the emission level cap value, CAPJ, produced by AECD 138$_J$. Generally, if either of the intake condensation AECD 152 or the EGR cooler condensation AECD 172 are active, the STATEJ output of OR block 184 will be "true", and the output of true/false block 186 will accordingly produce the condensation emission level cap value, CON CAP, stored within block 188. On the other hand, if neither of the intake condensation AECD 152 or the EGR cooler condensation AECD 172 are active, the STATEJ output of OR block 184 will be "false", and true/false block 186 will produce as its output the zero value stored within block 190.

The intake condensation AECD 152 further includes an intake condensation damage output, ICD, connected to a memory block 192, and the EGR cooler condensation AECD 172 includes a cooler condensation damage output, CCD, connected to a memory block 194. As will be described in greater detail hereinafter, both of the intake condensation AECD 152 and the EGR cooler condensation AECD 172 are operable, as long as the EGR valve 36 is open, to estimate cumulative damage values resulting from estimated condensation conditions at the outlet of EGR cooler 40 and in the intake conduit 20.

Figure 5:
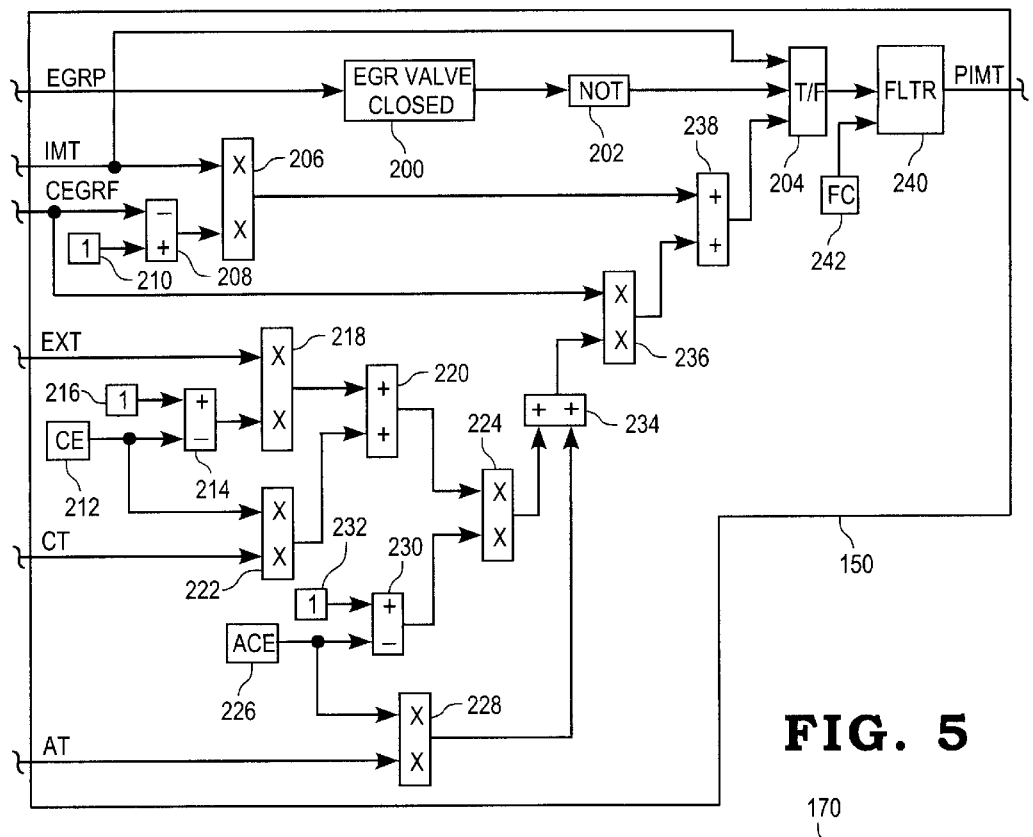
FIG. 5 is a diagrammatic illustration of one preferred embodiment of the predicted IMT virtual sensor block of FIG. 4, in accordance with the present invention.

Referring now to FIG. 5, one preferred embodiment of the predicted intake manifold temperature virtual sensor block 150, in accordance with the present invention, is shown. Block 150 includes an EGR valve closed block 200 receiving the EGR valve position value, EGRP, and producing an output indicative of the state of the EGR valve 36 relative to a closed position. If the EGR valve 36 is closed, the output of block 200 is "true", and is otherwise "false". The output of block 200 is provided as an input to a NOT block 202 having an output connected to the control input of a true/false block 204. If the EGR valve 36 is closed, the control input to true/false block 204 is "false", and if the EGR valve 36 is open, the control input of true/false block 204 is "true". The "true" input of true/false block 204 receives the intake manifold temperature value, IMT.

The predicted intake manifold temperature virtual sensor block 150 further includes an arithmetic block 208 having a subtraction input receiving the commanded EGR fraction signal, CEGRF, and an addition input receiving a constant value (e.g., 1) from block 210. The output of arithmetic block 208 is supplied to a first input of a multiplication block 206 having a second input receiving the intake manifold temperature signal, IMT.

A maximum EGR cooler efficiency value, CE, is stored within block 212 and is provided to a subtraction input of an arithmetic block 214 having an addition input receiving a value (e.g., 1) from block 216. The maximum EGR cooler efficiency value, CE, stored within block 212 represents the ability of EGR cooler 40 to cool exhaust gas flowing therethrough, and is generally dependent upon the physical design of EGR cooler 40. In any case, the output of arithmetic block 214 is supplied to a first input of a multiplication block 218 having a second input receiving the engine exhaust temperature value, EXT. The output of multiplication block 218 is provided to a first input of an addition block 220 having a second input receiving the output of another multiplication block 222 having a first input receiving the maximum EGR cooler efficiency value, CE, and a second input receiving the coolant temperature value, CT. The output of addition block 220 is supplied to a first input of another multiplication block 224 having a second input receiving the output of an arithmetic block 230. An addition input of arithmetic block 230 receives a constant value (e.g., 1) from block 232, and a subtraction input of arithmetic block 230 receives an ambient cooling efficiency value, ACE, of stored in block 226. The ambient cooling efficiency value, ACE, represents a cooling effect on the recirculated exhaust gas due to ambient temperature, and may be represented as a constant as illustrated in FIG. 5, or may alternatively determined as a function of ambient temperature. In any case, the ambient cooling efficiency value, ACE, is further supplied to a first input of a multiplication block 228 having a second input receiving the ambient temperature signal, AT. The output of multiplication block 228 is supplied to a first input of an addition block 234 having a second input receiving the output of multiplication block 224. The output of addition block 234 is supplied to a first input of a multiplication block 236 having a second input receiving the commanded EGR fraction value, CEGRF. The output of multiplication block 236 is supplied to a first input of an addition block 238 having a second input receiving the output of multiplication block 206. The output of addition block 238 is supplied to the "false" input of true/false block 204. The output of true/false block 204 is supplied to a filter block 240 having a filter constant, FC, supplied by a filter constant block 242. In one embodiment, the filter block 240 is a first order filter, although the present invention contemplates that filter block 240 may alternatively be implemented as other known filter embodiments having any desired order. In any case, the output of filter block 240 is the predicted intake manifold temperature value, PIMT.

In accordance with the present invention, when the condensation protection AECD $138_f$ is active, EGR flow is stopped for a time period, as described briefly hereinabove and will be described in greater detail hereinafter, to prevent corrosive damage to the engine 12. Before restoring EGR flow, it is desirable to determine whether or not the engine 12 is operating in a manner that will result in excessive condensation either at the outlet of the EGR cooler 40 or within the intake conduit 20 and/or intake manifold 14. This requires an estimate of temperature that would exist in the intake manifold 14 if EGR was flowing at the currently commanded rate defined by the commanded EGR fraction value, CEGRF, even though the AECD $138_f$ has overridden CEGRF and has commanded the EGR valve 36 closed. Under such conditions, this temperature is the predicted intake manifold temperature value, PIMT, produced by the predicted intake manifold temperature virtual sensor block 150 illustrated in FIG. 5. In accordance with the structure of block 150 illustrated in FIG. 5, PIMT is determined when the EGR valve 36 is closed by computing a flow-weighted average of the current intake manifold temperature, IMT, and a prediction of the EGR temperature at the outlet of the EGR cooler 40. In accordance with the predicted intake manifold temperature model illustrated in FIG. 5, PIMT is equal to the sensed intake manifold temperature, IMT, whenever the EGR valve 36 is open.

Figure 6:
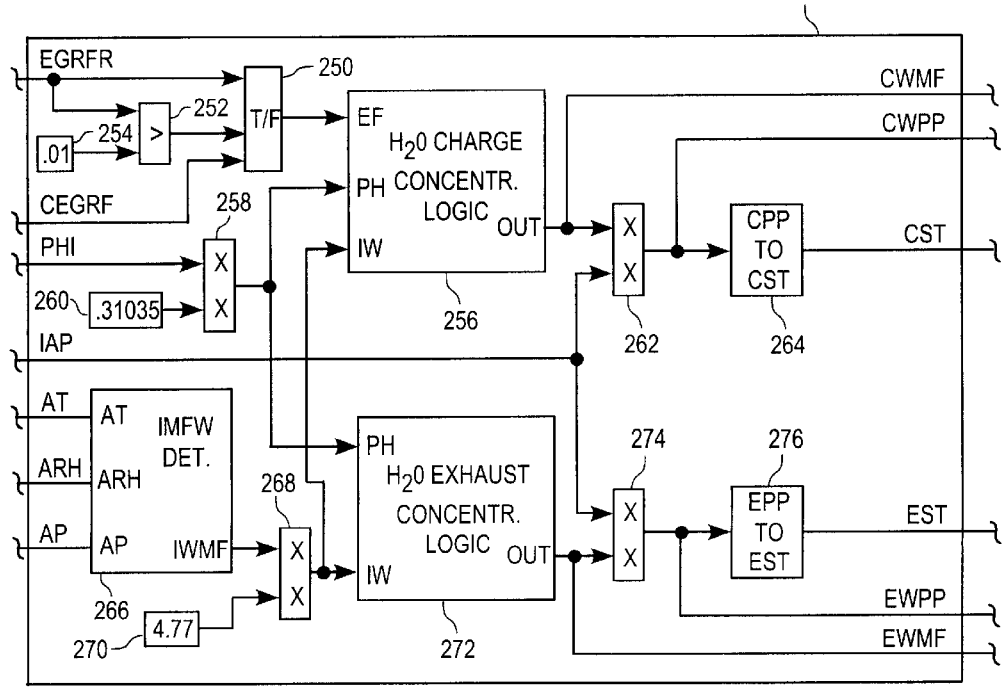
FIG. 6 is a diagrammatic illustration of one preferred embodiment of the saturation temperature and partial pressure virtual sensor block of FIG. 4, in accordance with the present invention.

Referring now to FIG. 6, one preferred embodiment of the saturation temperature and partial pressure virtual sensor block 170 of FIG. 4, in accordance with the present invention, is shown. Block 170 includes a true/false block 250 having a "true" input receiving the EGR fraction value, EGRFR, and a "false" input receiving the commanded EGR fraction value, CEGRF. An arithmetic block 252 has a first input receiving the EGR fraction value, EGRFR, and a second input receiving a constant value (e.g., 0.01) from block 254. The output of arithmetic block 252 is supplied to the control input of true/false block 250, the output of which is supplied to an EGR fraction input, EF, of an $H_2O$ charge concentration logic block 256. As long as the EGR fraction value, EGRFR, is greater than 0.01, true/false block 250 supplies the EGR fraction value, EGRFR, to the $H_2O$ charge concentration logic block 256. On the other hand, if the EGR fraction value, EGRFR, is not greater than 0.01, true/false block 250 supplies the commanded EGR fraction value, CEGRF, to the $H_2O$ charge concentration logic block 256.

Block 170 further includes a multiplication block 258 having a first input receiving the fuel/fresh air flow ratio, PHI, and a second input receiving a constant value (e.g., 0.31035) from block 260. The output of multiplication block 258 is supplied to a PH input of the $H_2O$ charge concentration of logic block 256 and to a PH input of an $H_2O$ exhaust concentration logic block 272.

Block 170 further includes an inlet mole fraction of water determination block 266 receiving as inputs the ambient temperature value, AT, the ambient relative humidity value, ARH, and the ambient pressure value, AP. Block 266 is operable, in a manner to be described more fully hereinafter, to process the foregoing input values and produce an inlet water mole fraction value, IWMF, at an output thereof. IWMF is supplied to one input of a multiplication block 268 having a second input receiving a constant value (e.g., 4.77) from block 270. The output of multiplication block 268 is supplied to an inlet water input, IW, of blocks 256 and 272.

It is to be understood that the constant values contained within blocks 254, 260 and 270 are provided only by way of example, and that the present invention contemplates that such blocks may alternatively contain other values. Any particular values stored within blocks 254, 260 and/or 270 will generally depend on one or more physical properties of engine 12 and/or its associated air handling system.

In any case, the $H_2O$ charge concentration logic block 256 is operable, in a manner to be described more fully hereinafter, to process its various input values to determine a charge water mole fraction value, CWMF, and produce CWMF an output thereof. Generally, the charge water mole fraction value, CWMF, corresponds to the moles of water per mole of mixed charge. CWMF is supplied to a first input of a multiplication block 262 having a second input receiving the intake air pressure value, IAP. The output of multiplication block 262 represents a charge water partial pressure value, CWPP, which is the product of the current intake air pressure value, IAP, and the charge water mole fraction value, CWMF. CWPP is supplied as an input to a charge partial pressure-to-charge saturation temperature correlation block 264, which is operable to convert the partial pressure value to a saturation temperature value, CST. Generally, block 264 is operable to determine the total amount of water in the mixed charge at saturation (100% relative humidity) for given values of charge water partial pressure, CWPP, wherein this total amount of water is expressed in terms of a saturation temperature, CST, using known relationships. The charge saturation temperature value, CST, represents the temperature at which water will start to condense from the mixed charge, given the amount of water currently present in the charge. In one embodiment, block 264 is implemented as a two-dimensional table mapping charge water partial pressure values, CWPP, to charge saturation temperature values, CST. Alternatively, block 264 may be implemented in the form of one or more equations, charts, graphs and/or the like.

The $H_2O$ exhaust concentration logic block 272 is operable, in a manner to be described more fully hereinafter, to process its various input signals and produce as an output an exhaust water mole fraction value, EWMF. Generally, the exhaust water mole fraction value, EWMF, corresponds to the moles of water per mole of exhaust gas, and is determined as a function of the total amount of water in the fresh air entering the turbocharger compressor inlet (represented by IWMF), and an amount of water resulting from the combustion of fuel (represented by PHI). EWMF is supplied to one input of a multiplication block 274 having a second input receiving the intake air pressure value, IAP. The output of multiplication block 274 represents an exhaust water partial pressure value, EWPP, which is the product of the current intake air pressure value, IAP, and the exhaust water mole fraction value, EWMF. EWPP is supplied as an input to an exhaust partial pressure-to-exhaust saturation temperature correlation block 276, which is operable to convert the partial pressure value to a saturation temperature value. Generally, block 276 is operable to determine the total amount of water in the exhaust gas at saturation (100% relative humidity) for given values of exhaust water partial pressure, EWPP, wherein this total amount of water is expressed in terms of a saturation temperature, using known relationships. The exhaust saturation temperature value, EST, represents the temperature at which water will start to condense from the exhaust gas, given the amount of water currently present in the exhaust gas. In one embodiment, block 276 is implemented as a two-dimensional table mapping exhaust water partial pressure values, EWPP, to exhaust saturation temperature values, EST. Alternatively, block 276 may be implemented in the form of one or more equations, graphs, charts and/or the like.

Figure 7:
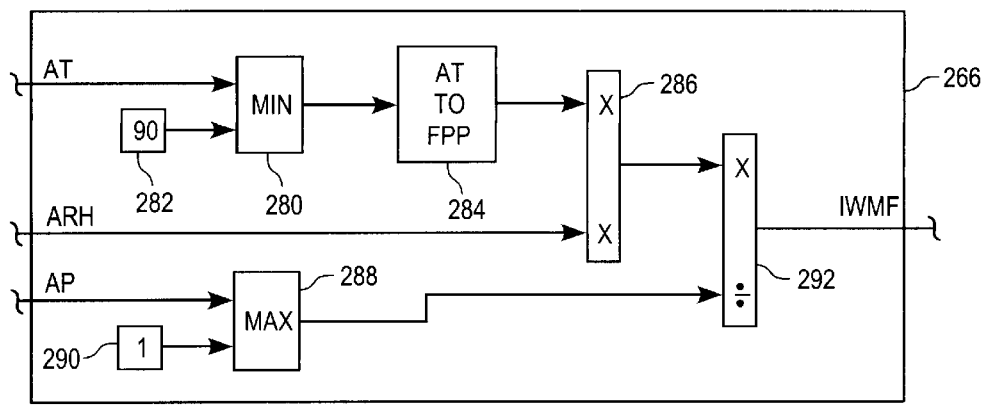
FIG. 7 is a diagrammatic illustration of one preferred embodiment of the inlet mole fraction of water (IMFW) determination block of FIG. 6, in accordance with the present invention.

Referring now to FIG. 7, one preferred embodiment of the inlet mole fraction of water block 266 of FIG. 6, in accordance with the present invention, is shown. Block 266 includes a minimum block 280 having one input receiving the ambient temperature signal, AT, and a second input receiving a constant value (e.g., 90) from block 282. The output of block 280 is the minimum of the ambient temperature value, AT, and the constant value contained within block 282, and is supplied as an input to an ambient temperature-to-fresh air partial pressure correlation block 284. Block 284 is operable to determine the total amount of water in ambient air at saturation (100% relative humidity) for given values of ambient temperature, AT, using known relationships. This total amount of water may be expressed as in terms of partial pressure (e.g., moles*psia) to normalize the data, and block 284 is accordingly operable to produce at its output partial pressure values representing the total amount of water in ambient air at saturation as a function of ambient temperature, AT. In one embodiment, block 284 is implemented as a two-dimension table mapping ambient temperature values, AT, to fresh air partial pressure values. Alternatively, block 284 may be implemented in the form of one or more equations, graphs, charts and/or the like. In any case, the output of block 284 is applied to a first input of a multiplication block 286 having a second input receiving the ambient relative humidity value, ARH. A maximum block 288 has a first input receiving the ambient pressure value, AP, and a second input receiving a constant value (e.g., 1) contained within block 290. Block 288 is operable to produce as an output the maximum value of the ambient pressure value, AP, and the constant value, contained within block 290, wherein this maximum value is applied to a division output of an arithmetic block 292. Arithmetic block 292 includes a multiplication input receiving the output of multiplication block 296, and the output of arithmetic block 292 defines the inlet water mole fraction value, IWMF. The constant value stored within block 282 represents a water temperature limit, and in the embodiment shown is set at 90° F., although the present invention contemplates other water temperature limits to be stored within block 282. The constant value stored within block 290 is provided as a divide-by-zero protection measure for block 292 and may be set at any desired constant value to provide divide-by-zero protection. Those skilled in the art will recognize that the constant values contained within blocks 282 and 290 will generally depend on AECD design goals as well as on the physical properties of engine 12 and/or its associated air handling system. In any case, the inlet water mole fraction value, IWMF, produced by block 266 corresponds to the total amount of water present in the fresh air entering the inlet to the turbocharger compressor 16, and is a function of the ambient temperature value, AT, ambient relative humidity value, ARH, and ambient pressure value, AP.

Figure 8:
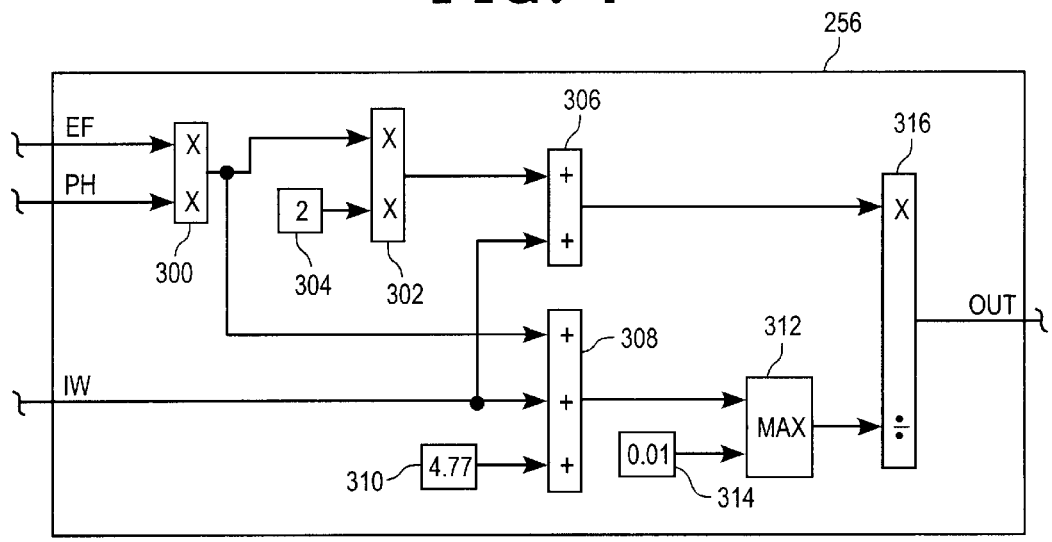
FIG. 8 is a diagrammatic illustration of one preferred embodiment of the $H_2O$ charge concentration logic block of FIG. 6, in accordance with the present invention.

Referring now to FIG. 8, one preferred embodiment of the $H_2O$ charge concentration logic block 256 of FIG. 6, in accordance with the present invention, is shown. Block 256 includes a multiplication block 300 having a first input receiving the EGR fraction value, EF, produced by true/false block 250 of FIG. 6, and a second input receiving the adjusted fuel/fresh air flow ratio value, PH, produced by multiplication block 258. The output of multiplication block 300 is supplied as a first input to a second multiplication block 302 having a second input receiving a constant value (e.g., 2) contained within block 304. The output of multiplication block of 302 is supplied as a first input to an addition block 306 having a second input receiving the adjusted inlet water mole fraction value, IW, produced by multiplication block 268 of FIG. 6. A second addition block 308 includes a first input receiving the output of multiplication block 300, a second input receiving the adjusted inlet water mole fraction value, IW, produced by multiplication block 268, and a third input receiving a constant value (e.g., 4.77) contained within block 310. An output of block 308 is supplied as a first input to a maximum bock 312 having a second input receiving a constant value (e.g., 0.01) from block 314. Maximum block 312 produces as an output the maximum of the output produced by addition block 308 and the constant value contained within block 314, and supplies this value to a division input of an arithmetic block 316. Arithmetic block 316 includes a multiplication input receiving the output of addition block 306, and produces at its output the charge water mole fraction value, CWMF, of block 256.

Those skilled in the art will recognize that the constants stored within blocks 304, 310 and 314 are provided only by way of example, and that other constant values may be stored within these blocks. For example, the constant value stored within block 314 is provided as a divide-by-zero protection feature for arithmetic block 316, and may accordingly be set at any desired constant value that suits the application. The constant values stored within blocks 304 and 310 will generally depend on AECD design goals and/or physical properties of engine 12 and its associated air handling system.

Figure 9:
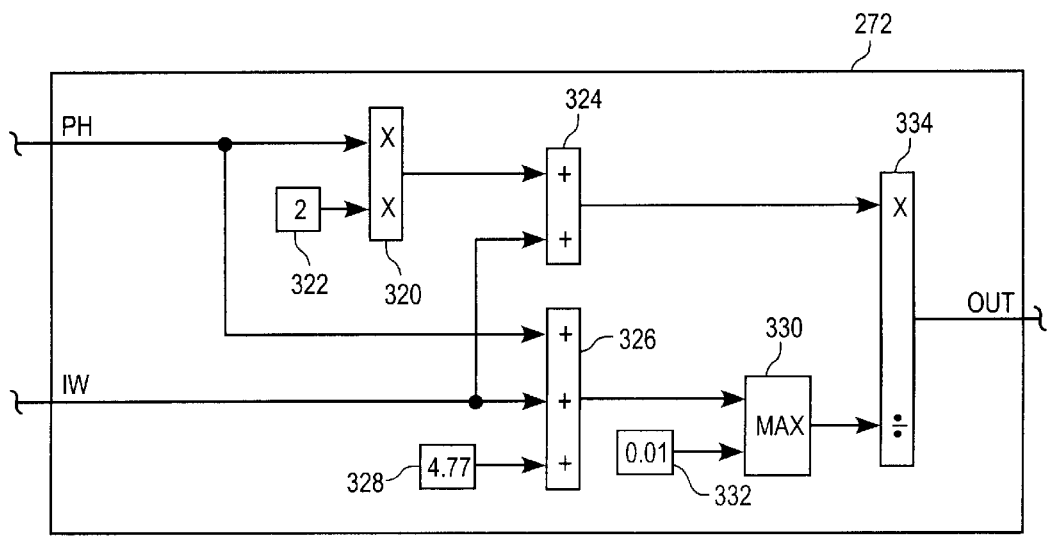
FIG. 9 is a diagrammatic illustration of one preferred embodiment of the $H_2O$ exhaust concentration logic block of FIG. 6, in accordance with the present invention.

Referring now to FIG. 9, one preferred embodiment of the $H_2O$ exhaust concentration logic block 272 of FIG. 6, in accordance with the present invention, is shown. Block 272 includes a multiplication block 320 having a first input receiving the adjusted fuel/fresh air flow ratio value, PH, produced by multiplication block 258 of FIG. 6, and a second input receiving a constant value (e.g., 2) contained within block 322. The output of multiplication block 320 is provided as a first input to an addition block 324 having a second input receiving the adjusted inlet water mole fraction value, IW, produced by multiplication block 268 of FIG. 6. Block 272 further includes a second addition block 326 having a first input receiving the PH value, a second input receiving the IW value, and a third input receiving a constant value (e.g., 4.77) contained within block 328. The output of addition block 326 is provided as a first input to a maximum block 330 having a second input receiving a constant value (e.g., 0.01) contained within block 332. The maximum block 330 produces as an output the maximum value of the output of addition block 326 and the constant value stored within block 332, and this maximum value is supplied as a division input to an arithmetic block 334 having a multiplication input receiving the output of addition bock 324. The output of arithmetic block 334 defines the exhaust water mole fraction value, EWMF, produced by block 272.

Those skilled in the art will recognize that the constants stored within blocks 322, 328 and 332 are provided only by way of example, and that other constant values may be stored within these blocks. For example, the constant value stored within block 332 is provided as a divide-by-zero protection feature for arithmetic block 334, and may accordingly be set at any desired constant value that suits the application. The constant values stored within blocks 322 and 328 will generally depend on AECD design goals and/or physical properties of engine 12 and its associated air handling system.

The configuration of the condensation, AECD $138_I$, illustrated in FIG. 4 requires an estimate of the water content in fresh air, engine exhaust, and intake air charge. The saturation temperature and partial pressure virtual sensor block 170 is operable to estimate these quantities wherein the fresh air water content is determined by the inlet mole fraction of water determination block 266 illustrated in FIGS. 6 and 7. The water content of the engine exhaust is estimated using the $H_2O$ exhaust concentration logic block 272 illustrated in FIGS. 6 and 9, and the water content of the mixed charge in the intake manifold 14 is determined within the $H_2O$ charge concentration logic block 256 illustrated in FIGS. 6 and 8 by adding the fresh air and exhaust water content values mixed at the current ratio defied by the EGR fraction value, EF. The maximum amount of water that can be stored as a vapor is determined as a normalized function of temperature, wherein the relationship between the maximum partial pressure of water at a given temperature is defined by correlation blocks 264 and 276.

Figure 10:
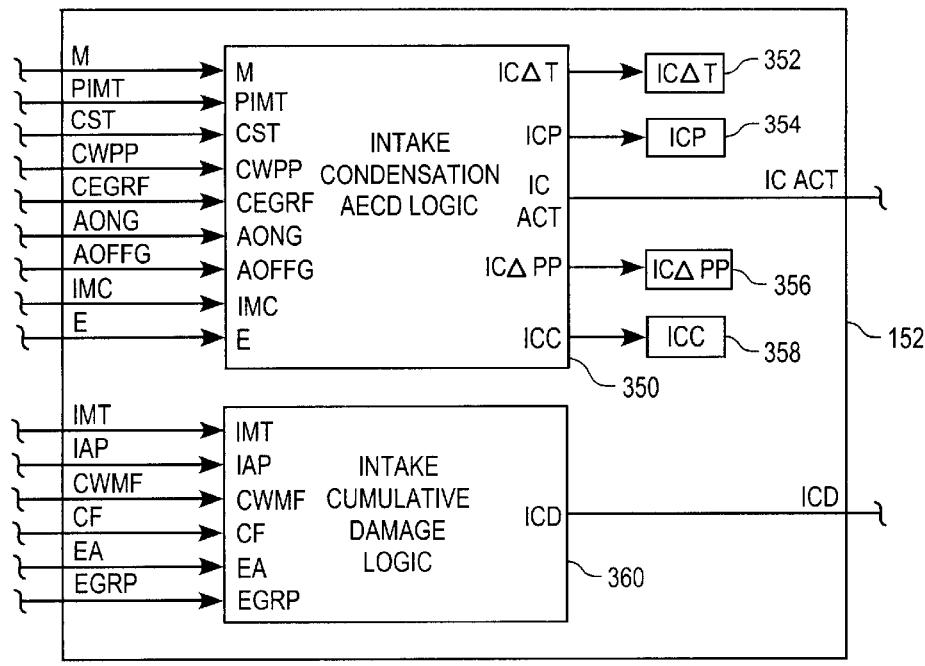
FIG. 10 is a diagrammatic illustration of one preferred embodiment of the intake condensation AECD block of FIG. 4, in accordance with the present invention.

Referring now to FIG. 10, one preferred embodiment of the intake condensation, AECD 152 of FIG. 4, in accordance with the present invention, is shown. Block 152 includes an intake condensation AECD logic block 350 receiving as inputs the condensation margin value, M, stored within block 164 of FIG. 4, the predicted intake manifold temperature value, PIMT, produced by virtual sensor block 150, the charge saturation temperature value, CST, and charge water partial pressure value, CWPP, produced by the saturation temperature and partial pressure virtual sensor block 170, the commanded EGR fraction value, CEGRF, the adjusted "on" gain value, AONG, produced by multiplication block 158, the adjusted "off" gain value, AOFFG, produced by multiplication block 162, the intake maximum count value, IMC, stored within block 154, and the enable value, E, produced by the AND block 168 of FIG. 4. The intake condensation, AECD logic block 350 is operable, in a manner to be described more fully hereinafter, to process the foregoing input values and produce as its output the intake condensation active signal, IC ACT, produced by the intake condensation AECD block 152. Additionally, logic block 350 is operable to produce as an output an intake condensation delta temperature value, ICΔT, which is stored in a memory block 352, an intake condensation possible value, ICP, which is stored in a memory location 354, an intake condensation delta partial pressure value, ICΔPP, which is stored in a memory location 356, and an intake condensation count value, ICC, which is stored within a memory location 358.

Block 152 further includes an intake cumulative damage logic block 360 receiving as inputs the intake manifold temperature value, IMT, the intake air pressure value, IAP, the charge water mole fraction value, CWMF, the charge flow value, CF, the engine active value, EA, and the EGR valve position value, EGRP. The intake cumulative damage logic block 360 is operable, in a manner to be described more fully hereinafter, to process the foregoing input values and produce as an output a cumulative intake condensation damage value, ICD.

Figure 11:
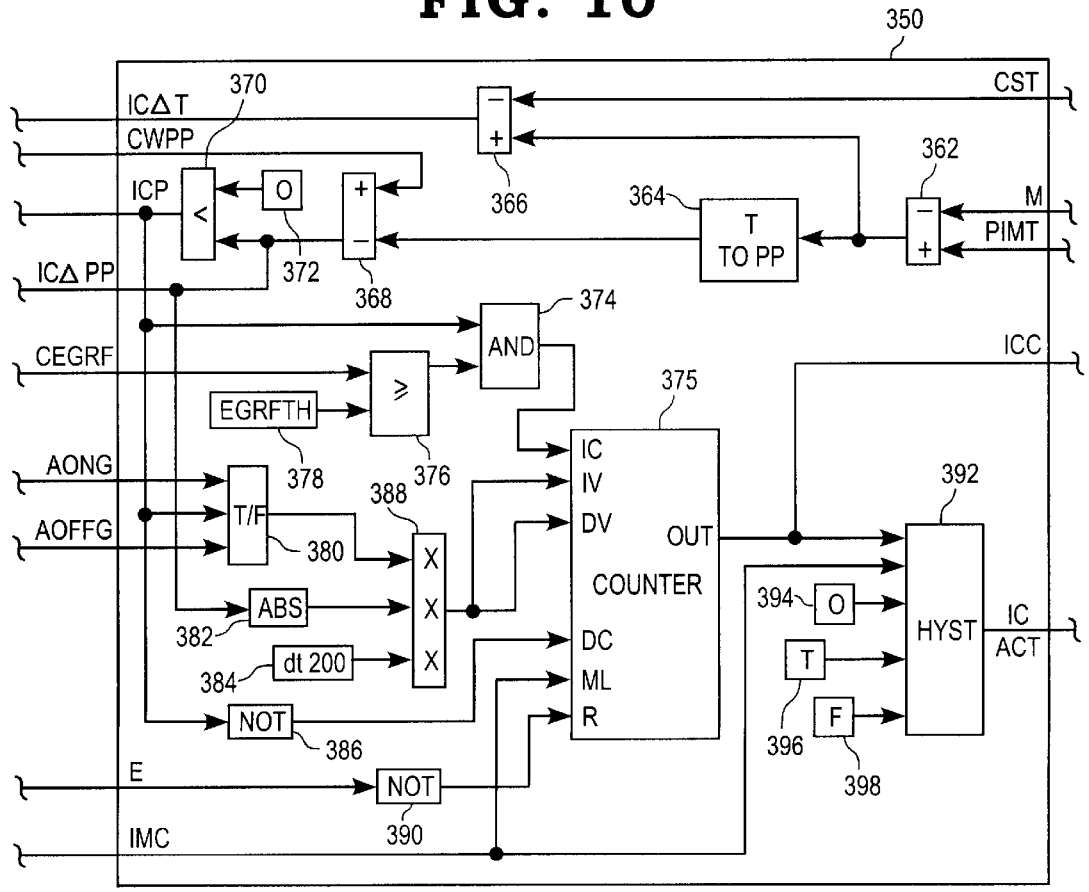
FIG. 11 is a diagrammatic illustration of one preferred embodiment of the intake condensation AECD logic block of FIG. 10, in accordance with the present invention.

Referring now to FIG. 11, one preferred embodiment of the intake condensation, AECD logic block 350 of FIG. 10, in accordance with the present invention, is shown. Block 350 includes an arithmetic block 362 having an addition input receiving the predicted intake manifold temperature value, PIMT, produced by virtual sensor block 150, and a subtraction input receiving the condensation margin value, M, contained within memory block 164 of FIG. 4. The output of arithmetic block 362 is provided as the input to a temperature-to-partial pressure correlation block 364. In one embodiment, block 364 is implemented as a two-dimensional table mapping the temperature difference values produced at the output of arithmetic block 362 to partial pressure values. Alternatively, block 364 may be implemented in the form of one or more equations, graphs, charts, and/or the like. The output of block 362 is also supplied as an addition input to an arithmetic block 366 having a subtraction input receiving the charge saturation temperature value, CST. The output of arithmetic block 366 is the intake condensation delta temperature value, ICΔT, which is stored within memory block 352.

Block 350 further includes an arithmetic block 368 having a subtraction input receiving the partial pressure value produced by correlation block 364, and an addition input receiving the charge water partial pressure value, CWPP, produced by virtual sensor block 170. The output of arithmetic block 368 defines the intake condensation delta partial pressure value, ICΔPP, and is provided to a first input of an arithmetic block 370 having a second input receiving a constant value (e.g. 0) stored within block 372. Arithmetic block 370 is operable to produce as an output the intake condensation possible value, ICP, which will be "true" if the intake condensation delta partial pressure value, ICΔPP, is less than zero, and will otherwise be "false". In general, ICP represents the possibility of an intake condensation state, which is indicative of whether current engine operating conditions would result in condensation of mixed EGR and fresh air within the intake conduit 20 and/or intake manifold 14. In any case, the output of arithmetic block 370 is provided to a first input of an AND block 374 having a second input receiving the output of an arithmetic block 376. Arithmetic block 376 has a first input receiving the commanded EGR fraction value, CEGRF, and a second input receiving an EGR fraction threshold value, EGRFTH, stored within block 378. As long as the commanded EGR fraction value, CEGRF, is greater than or equal to the EGR fraction threshold value, EGRFTH, the output of arithmetic block 378 will be "true", and will otherwise be "false". The output of AND block 374 is provided to an increment condition input, IC, of a counter block 375.

Block 350 further includes a true/false block 380 receiving as a control input the intake condensation possible signal, ICP, and including a "true" input receiving the adjusted "on" gain value, AONG, and a "false" input receiving the adjusted "off" gain value, AOFFG. The output of true/false block 380 is provided to a first input of a multiplication block 388 having a second input receiving the output of an absolute value block 382 receiving as an input the intake condensation delta partial pressure value, ICΔPP. A third input of multiplication block 388 receives a constant dt value (e.g., 200) stored within memory block 384. The output of multiplication block 388 is provided to increment value, IV, and decrement value, DV, inputs of counter block 375.

The intake condensation possible value, ICP, is further provided as in input to a NOT block 386 having an output connected to a decrement condition input, DC, of counter block 375. The enable value, E, is provided as an input to another NOT block 390 having an output connected to a reset input, R, of counter 375. The intake maximum count value, IMC, stored within block 154 of FIG. 4, is provided to a maximum limit input, ML, of counter block 375.

The output of counter block 375 is provided as one input to a hysteresis block 392 having a second input receiving the intake maximum count value, IMC. A third input of hysteresis block 392 receives a minimum constant value (e.g., zero) stored within memory block 394, and fourth and fifth inputs of hysteresis block 392 receive true and false values stored within respective memory blocks 396 and 398. The output of counter block 375 defines the intake condensation count value, ICC, and the output of hysteresis block 392 defines the intake condensation active value, IC ACT, produced by block 152.

In the operation of block 350 the difference between PIMT and M is converted from temperature to partial pressure by correlation block 364, and substrated from the charge water partial pressure value, CWPP, to produce the intake condensation delta partial pressure value, ICΔPP. When ICΔPP is greater than zero, condensation within the intake conduit 20 and/or intake manifold 14 is possible, and the intake condensation possible value, ICP, is set to "true". Under such conditions, the output of true/false block 380 is equal to the adjusted "on" gain value, ONG, and the increment condition, IC, of counter 375 is activated as long as the commanded EGR fraction value, CEGRF, is greater than the predefined EGR fraction threshold value, EGRFTH. The decrement condition, DC, input of counter 375 under such conditions will be deactivated since the output of NOT block 386 produces a "false" value as long as ICP is "true". As long as the enable value, E, is "true", counter 375 will not be reset (e.g., the reset input of counter 375 is active "low"), and under such conditions will increment by a count value determined as the product of the adjusted "on" gain value, AONG, the absolute value of the intake condensation delta partial pressure value, ICΔPP, and the constant value contained within memory block 384. The output of counter block 375 is passed through the hysteresis block 392 having a maximum value set by the intake maximum count value, IMC, and a minimum value set by the constant value stored within memory block 394. Under the conditions just described, the intake condensation active signal, IC ACT, will be set to a "true" value as soon as the count value produced by counter 375 reaches the intake maximum count value, IMC.

Under conditions where the intake condensation delta partial pressure value, ICΔPP, is less than zero, the intake condensation possible value, ICP, will be set to "false", and the increment condition input, IC, of counter block 375 will accordingly be deactivated. Since the output of NOT block 386 is the inverse of the intake condensation possible value, ICP, the decrement condition input, DC, of counter 375 will be activated. The control input to true/false block 380 will likewise be "false", and output of true/false block 380 will accordingly be the adjusted "off" gain value, AOFFG, and the decrement value input, DV, of counter block 375 will be set to the product of the adjusted "off" gain value, AOFFG, the absolute value of the intake condensation delta partial pressure value, ICΔPP, and the constant value stored within memory block 384. In this case, the intake condensation active output, IC ACT, of hysteresis block 392 will be set to "false" as soon as the count value of counter block 375 reaches the constant value stored within memory block 394.

A primary purpose of the intake condensation ACD logic block 350 is to determine whether the engine 12 is currently operating in an manner will result in the collection of excessive condensation within the intake conduit 20 and/or intake manifold 14 while EGR is flowing through EGR value 36. If EGR is currently flowing, block 350 is operable to set the intake condensation active value, IC ACT, to a "true" value after passage of a delay period defined by the counter block 375 to thereby allow brief periods of condensation within intake conduit 20 and/or intake manifold 14. If, on the other hand, EGR is currently being held off because the intake condensation AECD logic block 350 is currently active, block 350 is operable to determine if condensation would be present upon restoration of EGR flow by comparing the predicted intake manifold temperature signal, PIMT, to the margin value, M and determining therefrom a status of the intake condensation possible value, ICP. EGR flow is restored only after the foregoing signal values indicate that condensation would not be present upon restoration of EGR flow for a delay period defined by the counter block 375.

Figure 12:
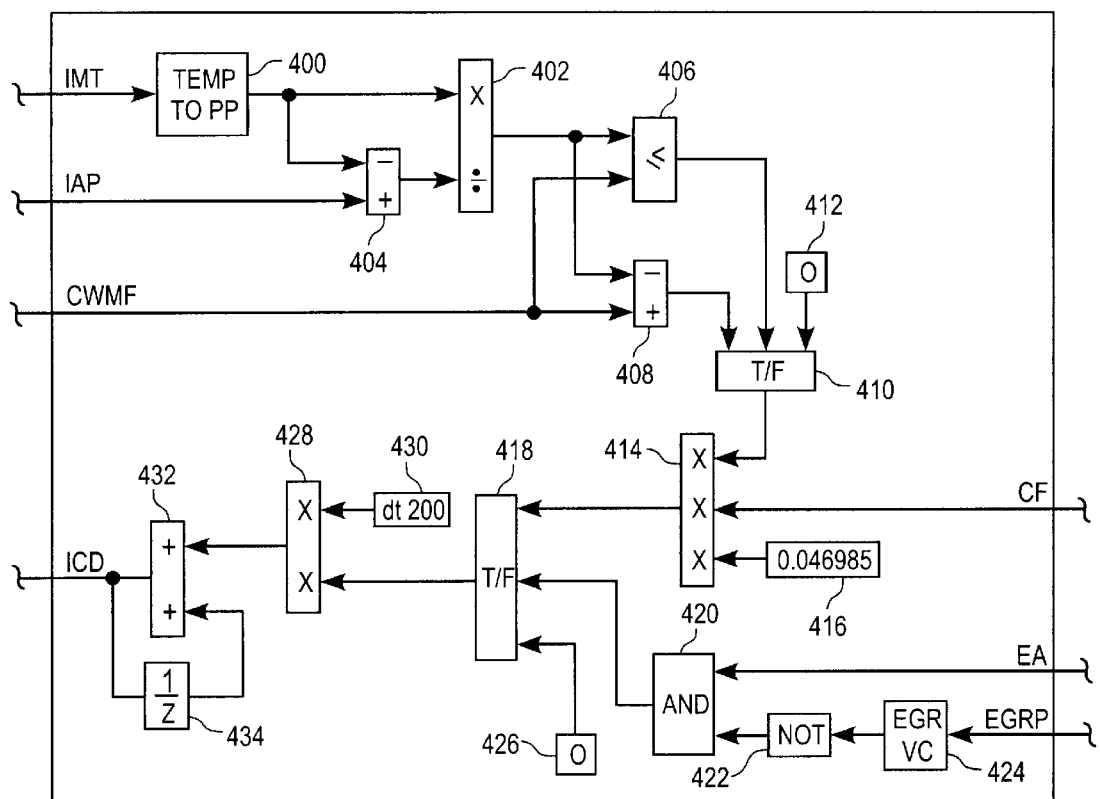
FIG. 12 is a diagrammatic illustration of one preferred embodiment of the intake cumulative damage logic block of FIG. 10, in accordance with the present invention.

Referring now to FIG. 12, one preferred embodiment of the intake cumulative damage logic block 360 of FIG. 10, in accordance with the present invention, is shown. Block 360 includes a temperature-to-partial pressure correlation block 400 receiving as an input the intake manifold temperature value, IMT, and producing as an output a partial pressure value corresponding thereto. In one embodiment, block 400 is implemented as a two-dimensional table mapping intake manifold temperature values, IMT, to corresponding partial pressure values, although the present invention contemplates that block 400 may alternatively be implemented in the form of one or more equations, graphs, charts, and/or the like. In any case, the output of block 400 is supplied to a multiplication input of an arithmetic block 402 having a division input receiving the output of another arithmetic block 404 having a subtraction input receiving the output of correlation block 400 and an addition input receiving the intake air pressure value, IAP. The output of arithmetic block 402 is supplied to one input of an arithmetic block 406 having a second input receiving the charge water mole fraction value, CWMF, produced by virtual sensor block 170. The output of arithmetic block 406 is supplied to a control input of a true/false block 410 having a "false" input receiving a constant value (e.g., 0) stored within memory block 412, and a "true" input receiving the output of an arithmetic block 408 having a subtraction input receiving the output of arithmetic block 402 and an addition input receiving the charge water mole fraction value, CWMF. As long as the partial pressure ratio value produced by arithmetic block 402 is less than or equal to the charge water mole fraction value, CWMF, the output of arithmetic block 406 will be "true", and the true/false block 410 will produce as its output the difference between the charge water mole fraction value, CWMF, and the partial pressure ratio value produced by block 402. On the other hand, if the charge water mole fraction value, CWMF, is greater than the partial pressure ratio value produced by block 402, the control input of true/false block 410 will be "false" and true/false block 410 will produce as its output the constant value (e.g., 0) produced by block 412.

The output of true/false block 410 is supplied to a first input of multiplication block 414 having a second input receiving the charge flow value, CF, and a third input receiving a constant value (e.g. 0.046985) stored within memory block 416. The output of multiplication block 414 is supplied to a "true" input of a true/false block 418 having a "false" input receiving a constant value (e.g., 0) stored within a memory block 426. The EGR valve position value, EGRP, is provided as an input to an EGR valve closed block 424 operable to determine the state of EGR valve 36 relative to a closed state. The output of block 424 is supplied to an input of a NOT block 422, the output of which is supplied to one input of AND block 420 having a second input receiving the engine active value EA. The output of AND block 420 is supplied to the control input of true/false block 418. As long as the engine is active (e.g., engine is running), and the EGR valve 36 is open, the output of AND block 420 will be "true" and the output of true/false block 418 will be the product of the output of true/false block 410, the charge flow value, CF and the constant value stored within block 416. If, on the other hand, the EGR valve 36 is closed, the output of AND block 420 will be "false" and the output of true/false block 418 will be set to the constant value (e.g., 0) stored within memory block 426.

The output of true/false block 418 is supplied to one input of a multiplication block 428 having a second input receiving a constant value, dt (e.g., 200), stored within a memory block 430. The output of multiplication block 428 is supplied to a first input of an addition block 432 producing as an output the intake condensation damage value, ICD. The intake condensation damage value, ICD, is supplied as an input to a delay block 434, the output of which is supplied to the second input of addition block 432.

As long as the EGR valve 36 is closed, the control input to true/false block 418 will be "false", and the intake condensation damage value, ICD, will be zero. If the EGR valve 36 is open and the engine is currently active (e.g., running) the control input of true/false block 418 will be "true" and the intake condensation damage value, ICD, will be depend on the output of true/false block 410. If the charge water mole fraction value, CWMF, is less than the partial pressure ratio value produced by block 402, the output of true/false block 410 will be zero, and the intake condensation damage value, ICD, will likewise be zero. Such conditions generally represent EGR non-flow conditions or EGR flow conditions wherein condensation is not expected to be excessive. On the other hand, if the charge water mole fraction value, CWMF, is greater than the partial pressure ratio value produced by block 402, the output of true/false block 410 will be equal to the difference between the charge water mole fraction value, CWMF and the partial pressure ratio value produced by block 402, and the intake condensation damage value, ICD, will generally be equal to a product of the output of true/false block 410, the charge flow value, CF, the constant value stored within block 416, and the constant value stored within block 430. Under such conditions, the cumulative value of the intake condensation damage value, ICD, will continue to increase through the action of the additive delay block 434.

It is to be understood that the constant values stored within blocks 412, 416, 426 and 430 are provided only by way of example, and that the present invention contemplates storing other constant values within these locations. Generally, such values will depend on certain AECD design goals and/or physical properties associated with engine 12 and/or its associated air handling system.

It should now be apparent from the foregoing that the intake condensation AECD 152 is operable to monitor the predicted intake manifold temperature value, PIMT, and determine a charge water partial pressure value indicative of the water content of mixed charge supplied to the intake manifold 14, and determine an intake condensation state value, ICP, as a function thereof. If ICP indicates that condensation within either the intake conduit 20 or intake manifold 14 is possible and some EGR is flowing, AECD 152 issues a command to close the EGR valve 36 after a delay period defined by the counter block 375 to thereby allow for a small amount of condensation. If EGR is not flowing (e.g., EGR valve 36 is closed), AECD 152 is operable to monitor PIMT and determine whether condensation would be occurring if the EGR valve 36 was open. If so, AECD 152 is operable to maintain the EGR valve 36 closed. If/when AECD 152 determines that condensation within intake conduit 20 and/or intake manifold 14 is no longer possible, AECD 152 is operable to allow the air handling system (e.g., 106, 112 and 114) to resume control of the EGR valve 36.

Figure 13:
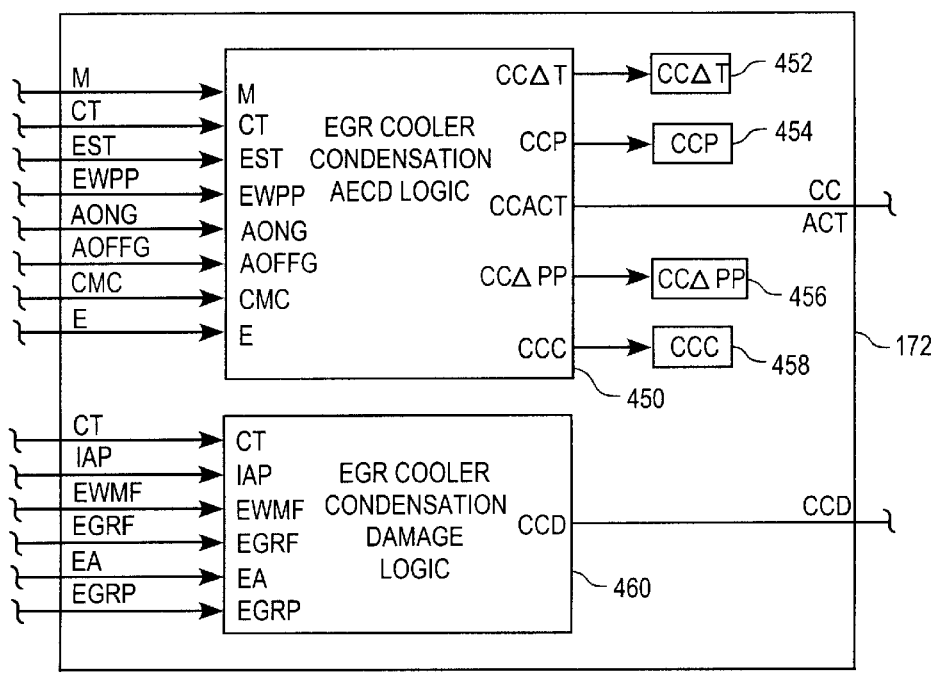
FIG. 13 is a diagrammatic illustration of one preferred embodiment of the EGR cooler condensation AECD block of FIG. 4, in accordance with the present invention.

Referring now to FIG. 13, one preferred embodiment of the EGR cooler condensation, AECD 172 of FIG. 4, in accordance with the present invention, is shown. Block 172 includes an EGR cooler condensation AECD logic block 450 receiving as inputs the condensation margin value, M, stored within block 164 of FIG. 4, the coolant temperature value, CT, the exhaust saturation temperature value, EST, and exhaust water partial pressure value, EWPP, produced by the saturation temperature and partial pressure virtual sensor block 170, the adjusted "on" gain value, AONG, produced by multiplication block 178, the adjusted "off" gain value, AOFFG, produced by multiplication block 182, the EGR cooler maximum count value, EMC, stored within block 174, and the enable value, E, produced by the AND block 168 of FIG. 4. The EGR cooler condensation, AECD logic block 450 is operable, in a manner to be described more fully hereinafter, to process the foregoing input values and produce as its output the EGR cooler condensation active signal, CC ACT, produced by the EGR cooler condensation AECD block 172. Additionally, logic block 450 is operable to produce as an output an EGR cooler condensation delta temperature value, CCΔT, which is stored in a memory block 452, an EGR cooler condensation possible value, CCP, which is stored in a memory location 454, an EGR cooler condensation delta partial pressure value, CCΔPP, which is stored in a memory location 456, and an EGR cooler condensation count value, CCC, which is stored within a memory location 458.

Block 172 further includes an EGR cooler cumulative damage logic block 460 receiving as inputs the coolant temperature value, CT, the intake air pressure value, IAP, the exhaust water mole fraction value, EWMF, the EGR flow value, EGRF, the engine active value, EA, and the EGR valve position value, EGRP. The EGR cooler cumulative damage logic block 460 is operable, in a manner to be described more fully hereinafter, to process the foregoing input values and produce as an output a cumulative EGR cooler condensation damage value, CCD.

Figure 14:
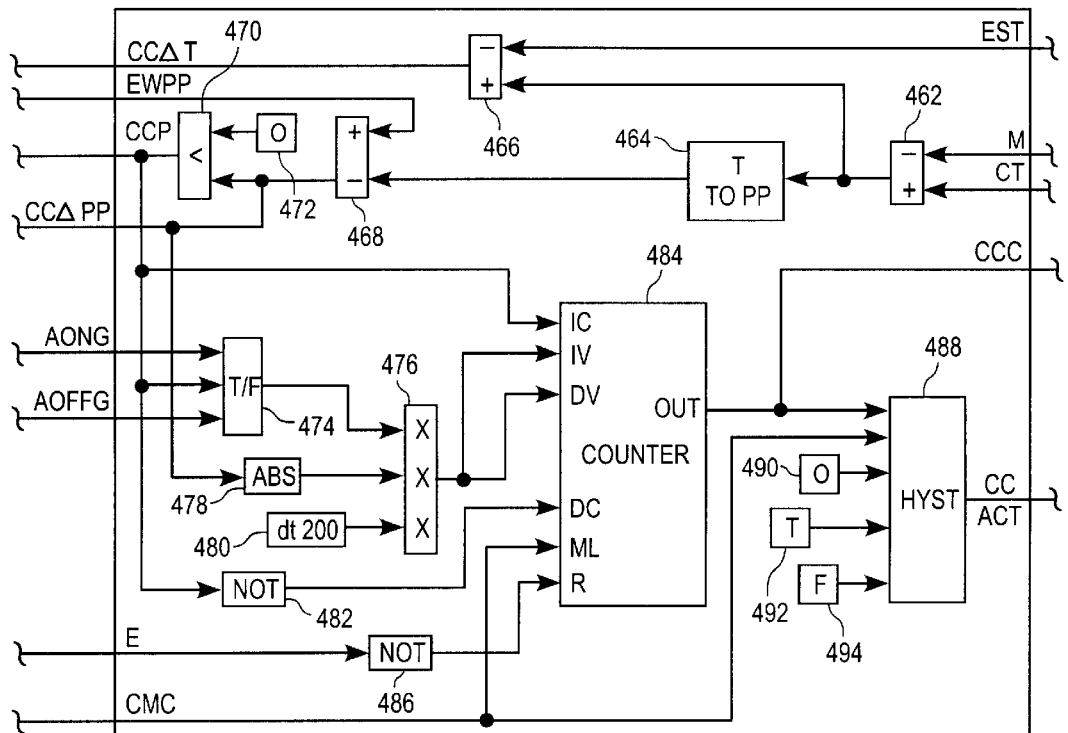
FIG. 14 is a diagrammatic illustration of one preferred embodiment of the EGR cooler condensation AECD logic block of FIG. 13, in accordance with the present invention.

Referring now to FIG. 14, one preferred embodiment of the EGR cooler condensation, AECD logic block 450 of FIG. 13, in accordance with the present invention, is shown. Block 450 includes an arithmetic block 462 having an addition input receiving the coolant temperature value, CT, and a subtraction input receiving the condensation margin value, M, contained within memory block 164 of FIG. 4. The output of arithmetic block 462 is provided as the input to a temperature-to-partial pressure correlation block 464. In one embodiment, block 464 is implemented as a two-dimensional table mapping the temperature difference values produced at the output of arithmetic block 462 to partial pressure values. Alternatively, block 464 may be implemented in the form of one or more equations, graphs, charts, and/or the like. The output of block 462 is also supplied as an addition input to an arithmetic block 466 having a subtraction input receiving the exhaust saturation temperature value, EST. The output of arithmetic block 466 is the EGR cooler condensation delta temperature value, CCΔT, which is stored within memory block 452.

Block 450 further includes an arithmetic block 468 having a subtraction input receiving the partial pressure value produced by correlation block 464, and an addition input receiving the exhaust water partial pressure value, EWPP, produced by virtual sensor block 170. The output of arithmetic block 468 defines the EGR cooler condensation delta partial pressure value, CCΔPP, and is provided to a first input of an arithmetic block 470 having a second input receiving a constant value (e.g. 0) stored within block 472. Arithmetic block 470 is operable to produce as an output the EGR cooler condensation possible value, CCP, which will be "true" if the EGR cooler condensation delta partial pressure value, CCΔPP, is less than zero, and will otherwise be "false". Generally, CCP represents an exhaust condensation state, which is indicative of whether current engine operating conditions will result in condensation at the outlet of EGR cooler 40. In any case, the CCP output of arithmetic block 470 is provided to an increment condition input, IC, of a counter block 484.

Block 450 further includes a true/false block 474 receiving as a control input the EGR cooler condensation possible signal, CCP, and including a "true" input receiving the adjusted "on" gain value, AONG, and a "false" input receiving the adjusted "off" gain value, AOFFG. The output of true/false block 474 is provided to a first input of a multiplication block 476 having a second input receiving the output of an absolute value block 478 receiving as an input the EGR cooler condensation delta partial pressure value, CCΔPP. A third input of multiplication block 476 receives a constant dt value (e.g., 200) stored within memory block 480. The output of multiplication block 476 is provided to increment value, IV, and decrement value, DV, inputs of counter block 484.

The EGR cooler condensation possible value, CCP, is further provided as in input to a NOT block 482 having an output connected to a decrement condition input, DC, of counter block 484. The enable value, E, is provided as an input to another NOT block 486 having an output connected to a reset input, R, of counter 484. The EGR cooler maximum count value, EMC, stored within block 174 of FIG. 4, is provided to a maximum limit input, ML, of counter block 484.

The output of counter block 484 is provided as one input to a hysteresis block 488 having a second input receiving the EGR cooler maximum count value, EMC. A third input of hysteresis block 488 receives a minimum constant value (e.g., zero) stored within memory block 490, and fourth and fifth inputs of hysteresis block 488 receive true and false values stored within respective memory blocks 492 and 494. The output of counter block 484 defines the EGR cooler condensation count value, CCC, and the output of hysteresis block 488 defines the EGR cooler condensation active value, CC ACT, produced by block 172.

In the operation of block 450 the difference between CT and M is converted from temperature to partial pressure by correlation block 464, and subtracted from the exhaust water partial pressure value, EWPP, to produce the EGR cooler condensation delta partial pressure value, CCΔPP. When CCΔPP is greater than zero, condensation at the outlet of EGR cooler 40 is possible, and the EGR cooler condensation possible value, CCP, is set to "true". Under such conditions, the output of true/false block 474 is equal to the adjusted "on" gain value, AONG, and the increment condition, IC, of counter 484 is activated. The decrement condition, DC, input of counter 484 under such conditions will be deactivated since the output of NOT block 482 produces a "false" value as long as CCP is "true". As long as the enable value, E, is "true", counter 484 will not be reset (e.g., the reset input of counter 484 is active "low"), and under such conditions will increment by a count value determined as the product of the adjusted "on" gain value, AONG, the absolute value of the EGR cooler condensation delta partial pressure value, CCΔPP, and the constant value contained within memory block 480. The output of counter block 484 is passed through the hysteresis block 488 having a maximum value set by the EGR cooler maximum count value, EMC, and a minimum value set by the constant value stored within memory block 490. Under the conditions just described, the EGR cooler condensation active signal, CC ACT, will be set to a "true" value as soon as the count value produced by counter 484 reaches the EGR cooler maximum count value, EMC.

Under conditions where the EGR cooler condensation delta partial pressure value, CCΔPP, is less than zero, the EGR cooler condensation possible value, CCP, will be set to "false", and the increment condition input, IC, of counter block 484 will accordingly be deactivated. Since the output of NOT block 482 is the inverse of the EGR cooler condensation possible value, CCP, the decrement condition input, DC, of counter 484 will be activated. The control input to true/false block 474 will likewise be "false", and output of true/false block 474 will accordingly be the adjusted "off" gain value, AOFFG, and the decrement value input, DV, of counter block 484 will be set to the product of the adjusted "off" gain value, AOFFG, the absolute value of the EGR cooler condensation delta partial pressure value, CCΔPP, and the constant value stored within memory block 480. In this case, the EGR cooler condensation active output, CC ACT, of hysteresis block 488 will be set to "false" as soon as the count value of counter block 484 reaches the constant value stored within memory block 490.

A primary purpose of the EGR cooler condensation ACD logic block 450 is to determine whether the engine 12 is currently operating in an manner will result in the collection of excessive condensation at the outlet of EGR cooler 40 while EGR is flowing through EGR value 36. If EGR is currently flowing, block 450 is operable to set the EGR cooler condensation active value, CC ACT, to a "true" value after passage of a delay period defined by the counter block 484 to thereby allow brief periods of condensation at the outlet of EGR cooler 40. If, on the other hand, EGR is currently being held off because the intake condensation AECD logic block 450 is currently active, block 450 is operable to determine if condensation would be present upon restoration of EGR flow by comparing the coolant temperature, CT, to the margin value, M and determining therefrom a status of the EGR cooler condensation possible value, CCP. EGR flow is restored only after the foregoing signal values indicate that condensation would not be present upon restoration of EGR flow for a delay period defined by the counter block 484.

Figure 15:
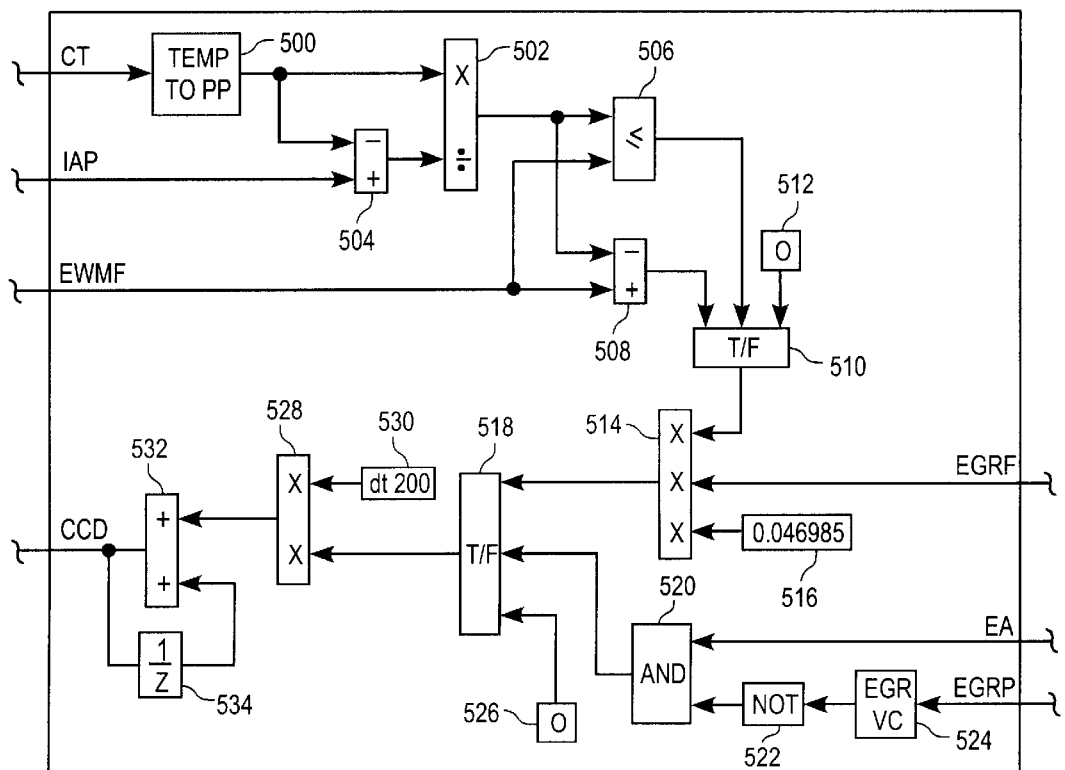
FIG. 15 is a diagrammatic illustration of one preferred embodiment of the EGR cooler condensation damage logic block of FIG. 13, in accordance with the present invention.

Referring now to FIG. 15, one preferred embodiment of the EGR cooler cumulative damage logic block 460 of FIG. 13, in accordance with the present invention, is shown.

Block 460 includes a temperature-to-partial pressure correlation block 500 receiving as an input the coolant temperature value, CT, and producing as an output a partial pressure value corresponding thereto. In one embodiment, block 500 is implemented as a two-dimensional table mapping coolant temperature values, CT, to corresponding partial pressure values, although the present invention contemplates that block 500 may alternatively be implemented in the form of one or more equations, graphs, charts, and/or the like. In any case, the output of block 500 is supplied to a multiplication input of an arithmetic block 502 having a division input receiving the output of another arithmetic block 504 having a subtraction input receiving the output of correlation block 500 and an addition input receiving the intake air pressure value, IAP. The output of arithmetic block 502 is supplied to one input of an arithmetic block 506 having a second input receiving the exhaust water mole fraction value, EWMF, produced by virtual sensor block 170. The output of arithmetic block 506 is supplied to a control input of a true/false block 510 having a "false" input receiving a constant value (e.g., 0) stored within memory block 512, and a "true" input receiving the output of an arithmetic block 508 having a subtraction input receiving the output of arithmetic block 502 and an addition input receiving the exhaust water mole fraction value, EWMF. As long as the partial pressure ratio value produced by arithmetic block 502 is less than or equal to the exhaust water mole fraction value, EWMF, the output of arithmetic block 506 will be "true", and the true/false block 510 will produce as its output the difference between the exhaust water mole fraction value, EWMF, and the partial pressure ratio value produced by block 502. On the other hand, if the exhaust water mole fraction value, EWMF, is greater than the partial pressure ratio value produced by block 502, the control input of true/false block 510 will be "false" and true/false block 510 will produce as its output the constant value (e.g., 0) produced by block 512.

The output of true/false block 510 is supplied to a first input of multiplication block 514 having a second input receiving the EGR flow value, EGRF, and a third input receiving a constant value (e.g. 0.046985) stored within memory block 516. The output of multiplication block 514 is supplied to a "true" input of a true/false block 518 having a "false" input receiving a constant value (e.g., 0) stored within a memory block 526. The EGR valve position value, EGRP, is provided as an input to an EGR valve closed block 524 operable to determine the state of EGR valve 36 relative to a closed state. The output of block 524 is supplied to an input of a NOT block 522, the output of which is supplied to one input of AND block 520 having a second input receiving the engine active value EA. The output of AND block 520 is supplied to the control input of true/false block 518. As long as the engine is active (e.g., engine is running), and the EGR valve 36 is open, the output of AND block 520 will be "true" and the output of true/false block 518 will be the product of the output of true/false block 510, the EGR flow value, EGRF and the constant value stored within block 516. If, on the other hand, the EGR valve 36 is closed, the output of AND block 520 will be "false" and the output of true/false block 518 will be set to the constant value (e.g., 0) stored within memory block 526.

The output of true/false block 518 is supplied to one input of a multiplication block 528 having a second input receiving a constant value, dt (e.g., 200), stored within a memory block 530. The output of multiplication block 528 is supplied to a first input of an addition block 532 producing as an output the EGR cooler condensation damage value, CCD. The EGR cooler condensation damage value, CCD, is supplied as an input to a delay block 534, the output of which is supplied to the second input of addition block 532.

As long as the EGR valve 36 is closed, the control input to true/false block 518 will be "false", and the EGR cooler condensation damage value, CCD, will be zero. If the EGR valve 36 is open and the engine is currently active (e.g., running) the control input of true/false block 518 will be "true" and the EGR cooler condensation damage value, CCD, will be depend on the output of true/false block 510. If the exhaust water mole fraction value, EWMF, is less than the partial pressure ratio value produced by block 502, the output of true/false block 510 will be zero, and the EGR cooler condensation damage value, CCD, will likewise be zero. Such conditions generally represent EGR non-flow conditions or EGR flow conditions wherein condensation is not expected to be excessive. On the other hand, if the exhaust water mole fraction value, EWMF, is greater than the partial pressure ratio value produced by block 502, the output of true/false block 510 will be equal to the difference between the exhaust water mole fraction value, EWMF and the partial pressure ratio value produced by block 502, and the EGR cooler condensation damage value, CCD, will generally be equal to a product of the output of true/false block 510, the EGR flow value, EGRF, the constant value stored within block 516, and the constant value stored within block 530. Under such conditions, the cumulative value of the EGR cooler condensation damage value, CCD, will continue to increase through the action of the additive delay block 534.

It is to be understood that the constant values stored within blocks 512, 516, 526 and 530 are provided only by way of example, and that the present invention contemplates storing other constant values within these locations. Generally, such values will depend on certain AECD design goals and/or physical properties associated with engine 12 and/or its associated air handling system.

It should now be apparent from the foregoing that the EGR cooler condensation AECD 172 is operable to monitor the coolant temperature value, CT, and determine an exhaust water partial pressure value indicative of the water content of engine exhaust flowing through EGR conduit 38, and determine a cooler condensation state value, CCP, as a function thereof. If CCP indicates that condensation at the outlet of EGR cooler 40 is possible, AECD 172 issues a command to close the EGR valve 36 after a delay period defined by the counter block 484. If EGR is not flowing (e.g., EGR valve 36 is closed), AECD 172 is operable to monitor CT and determine whether condensation would be occurring if the EGR valve 36 was open. If so, AECD 172 is operable to maintain the EGR valve 36 closed. If/when AECD 172 determines that condensation at the outlet of EGR cooler 40 is no longer possible, AECD 172 is operable to allow the air handling system (e.g., 106, 112 and 114) to resume control of the EGR valve 36.

In the embodiment of AECD $138_J$ illustrated and described herein, current engine operating conditions are compared to the relationship between partial pressure of water and temperature contained within the various temperature/partial pressure correlation tables (e.g., 264, 276, 284, 364, 400, 464 and 500), wherein the relationship between saturated air and temperature is constant. This constant relationship establishes a reference curve for comparison of current engine operating conditions. The distances "above" and "below" this curve define the delta partial pressure values, IC$\Delta$PP and CC$\Delta$PP. Operation above this curve (positive delta partial pressure values) is generally indicative of condensing conditions, and operation below this curve (negative delta partial pressure values) is generally indicative of non-condensing conditions. The distances to the "left" and "right" of this curve define the delta temperature values, IC$\Delta$T and CC$\Delta$T. Operation to the left of this curve (positive delta temperature values) is generally indicative of condensing conditions, and operation to the right of this curve (negative delta temperature values) is generally indicative of non-condensing conditions. The "dt 200" constant value represents the execution rate of the software code resident within AECD $138_J$. AECD $138_J$ also includes condensation damage assessment capabilities, wherein the condensing/non-condensing times are accumulated (added during condensation) to determine cumulative damage values for EGR cooler outlet condensation and for intake manifold/intake conduit condensation.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. System for protecting an internal combustion engine employing cooled recirculated exhaust gas from excessive condensation, the system comprising:

an EGR conduit fluidly connecting an intake manifold with an exhaust manifold of the engine;

an EGR valve controlling engine exhaust flow through the EGR conduit;

an EGR valve position sensor producing an EGR valve position signal indicative of a position of the EGR valve relative to a reference position;

an EGR valve actuator responsive to an actuator control signal to control the position of the EGR valve relative to the reference position;

an EGR cooler disposed in-line with the EGR conduit and operable to cool engine exhaust flowing through the EGR conduit;

means for determining a temperature value indicative of temperature within the intake manifold; and a control computer determining an amount of water present in a charge mixture of fresh air and engine exhaust supplied to the intake manifold and determining an intake condensation state as a function of the temperature value and of the amount of water present in the charge mixture, the control computer controlling the actuator control signal to close the EGR valve if the EGR valve position signal indicates that the EGR valve is positioned to allow engine exhaust flow through the EGR conduit and the condensation state indicates a condensation condition for at least a first time period.

2. The system of claim 1 further including an intake manifold temperature sensor producing an intake manifold temperature signal indicative of the temperature within the intake manifold;

and wherein the means for determining a temperature value is operable to determine the temperature value based on the intake manifold temperature signal if the EGR valve position signal indicates that the EGR valve is positioned to allow engine exhaust flow through the EGR conduit.

3. The system of claim 1 wherein the means for determining a temperature value is operable to determine the temperature value as a predicted temperature within the intake manifold if the EGR position signal indicates that the EGR valve is closed, the predicted temperature corresponding to a temperature that would be expected to exist in the intake manifold if the EGR valve was otherwise positioned to allow engine exhaust flow through the EGR conduit.

4. The system of claim 3 wherein the means for determining a temperature value is operable to determine the predicted temperature as a flow weighted average of the intake manifold temperature signal and a prediction of a temperature of engine exhaust exiting the EGR cooler if the EGR valve was otherwise positioned to allow engine exhaust flow through the EGR conduit.

5. The system of claim 4 further including:

means for determining an engine exhaust temperature corresponding to a temperature of engine exhaust exiting the exhaust manifold;

an ambient temperature sensor producing an ambient temperature signal indicative of ambient temperature; and a coolant temperature sensor producing a coolant temperature signal indicative of a temperature of coolant fluid used to cool the EGR cooler;

and wherein the means for determining a temperature value is operable to determine the prediction of the temperature of engine exhaust exiting the EGR cooler as a function of the engine exhaust temperature, the ambient temperature signal and the coolant temperature signal.

6. The system of claim 3 wherein the control computer is configured to maintain the EGR valve in a closed position if the EGR valve position signal indicates that the EGR valve is closed and the intake condensation state indicates that condensation would be occurring if the EGR valve was otherwise positioned to allow engine exhaust flow through the EGR conduit.

7. The system of claim 3 wherein the control computer is configured to control the actuator control signal to allow exhaust flow through the EGR conduit if the EGR valve position signal indicates that the EGR valve is closed and the intake condensation state indicates that condensation would not be occurring if the EGR valve was otherwise positioned to allow engine exhaust flow through the EGR conduit.

8. The system of claim 1 further including:

an ambient temperature sensor producing an ambient temperature signal indicative of ambient temperature;

an ambient pressure sensor producing an ambient pressure signal indicative of ambient pressure;

an ambient relative humidity sensor producing an ambient relative humidity signal indicative of ambient relative humidity;

an intake manifold pressure sensor producing an intake manifold pressure signal indicative of pressure within the intake manifold; and means for determining an EGR fraction value corresponding to a fraction of exhaust gas making up the charge mixture;

and wherein the control computer is configured to determine the amount of water present in the charge mixture as a function of the ambient temperature signal, the ambient pressure signal, the ambient relative humidity signal, the intake manifold pressure signal, the EGR fraction value and an amount of water resulting from combustion of fuel in the engine.

9. The system of claim 8 wherein the control computer is configured to determine an amount of water present in fresh air entering the intake manifold as a function of the ambient temperature signal, the ambient pressure signal and the ambient relative humidity signal, to determine a charge water mole fraction value, corresponding to moles of water per mole of fixed charge, as a function of the EGR fraction value, the amount of water resulting from combustion of fuel in the engine and the amount of water present in the fresh air entering the intake manifold, and to determine the amount of water present in the charge mixture, in the form of a charge water partial pressure value, as a function of the charge water mole fraction value and the intake manifold pressure signal.

10. The system of claim 1 further including:
an intake manifold temperature sensor producing an intake manifold temperature signal indicative of temperature within the intake manifold; and
an intake manifold pressure sensor producing an intake manifold pressure signal indicative of pressure within the intake manifold;
and wherein the control computer is further configured to accumulate an intake condensation damage value as a function of the amount of water present in the charge mixture, the intake manifold temperature signal and the intake manifold pressure signal if the EGR valve position signal indicates that the EGR valve is positioned to allow engine exhaust flow through the EGR conduit.

11. The system of claim 10 wherein the control computer is configured to determine a partial pressure ratio value as a function of the intake manifold temperature signal and the intake manifold pressure signal, to determine a current value of the intake condensation damage value as a function of the partial pressure ratio value and the amount of water present in the charge mixture, provided in the form of a charge water mole fraction value, if the charge water mole fraction value is greater than the partial pressure ratio value, and to set the current value of the intake condensation damage value to zero if the charge water mole fraction value is less than or equal to the partial pressure ratio value.

12. System for protecting an internal combustion engine employing cooled recirculated exhaust gas from excessive condensation, the system comprising:
an EGR conduit fluidly connecting an intake manifold with an exhaust manifold of the engine;
an EGR valve controlling engine exhaust flow through the EGR conduit;
an EGR valve position sensor producing an EGR valve position signal indicative of a position of the EGR valve relative to a reference position;
an EGR valve actuator responsive to an actuator control signal to control the position of the EGR valve relative to the reference position;
an EGR cooler disposed in-line with the EGR conduit and operable to cool engine exhaust flowing therethrough;
a coolant temperature sensor producing a coolant temperature signal indicative of a temperature of coolant used to cool the EGR cooler; and
a control computer determining an amount of water present in the engine exhaust flowing through the EGR conduit and determining an EGR cooler condensation state as a function of the temperature signal and of the amount of water present in the engine exhaust, the control computer controlling the actuator control signal to close the EGR valve if the EGR valve position signal indicates that the EGR valve is positioned to allow engine exhaust flow through the EGR conduit and the condensation state indicates a condensation condition for at least a first time period.

13. The system of claim 12 wherein the control computer is configured to maintain the EGR valve in a closed position if the EGR valve position signal indicates that the EGR valve is closed and the EGR cooler condensation state indicates that condensation would be occurring if the EGR valve was otherwise positioned to allow engine exhaust flow through the EGR conduit.

14. The system of claim 12 wherein the control computer is configured to control the actuator control signal to allow exhaust flow through the EGR conduit if the EGR valve position signal indicates that the EGR valve is closed and the EGR cooler condensation state indicates that condensation would not be occurring if the EGR valve was otherwise positioned to allow engine exhaust flow through the EGR conduit.

15. The system of claim 12 further including:
an ambient temperature sensor producing an ambient temperature signal indicative of ambient temperature;
an ambient pressure sensor producing an ambient pressure signal indicative of ambient pressure;
an ambient relative humidity sensor producing an ambient relative humidity signal indicative of ambient relative humidity; and
an intake manifold pressure sensor producing an intake manifold pressure signal indicative of pressure within the intake manifold;
and wherein the control computer is configured to determine the amount of water present in the engine exhaust flowing through the EGR conduit as a function of the ambient temperature signal, the ambient pressure signal, the ambient relative humidity signal, the intake manifold pressure signal and an amount of water resulting from combustion of fuel in the engine.

16. The system of claim 15 wherein the control computer is configured to determine an amount of water present in fresh air entering the intake manifold as a function of the ambient temperature signal, the ambient pressure signal and the ambient relative humidity signal, to determine an exhaust water mole fraction value, corresponding to moles of water per mole of exhaust gas, as a function of the amount of water resulting from combustion of fuel in the engine and the amount of water present in the fresh air entering the intake manifold, and to determine the amount of water present in the engine exhaust flowing through the ECR conduit, in the form of an exhaust water partial pressure value, as a function of the exhaust water mole fraction value and the intake manifold pressure signal.

17. The system of claim 12 further including an intake manifold pressure sensor producing an intake manifold pressure signal indicative of pressure within the intake manifold;
and wherein the control computer is further configured to accumulate an EGR cooler condensation damage value as a function of the amount of water present in the engine exhaust flowing through the EGR conduit, the coolant temperature signal and the intake manifold pressure signal if the EGR valve position signal indicates that the EGR valve is positioned to allow engine exhaust flow through the EGR conduit.

18. The system of claim 17 wherein the control computer is configured to determine a partial pressure ratio value as a function of the coolant temperature signal and the intake manifold pressure signal, to determine a current value of the EGR cooler condensation damage value as a function of the partial pressure ratio value and the amount of water present in the engine exhaust flowing through the EGR conduit, provided in the form of an exhaust water mole fraction value, if the exhaust water mole fraction value is greater than the partial pressure ratio value, and to set the current value of the EGR cooler condensation damage value to zero if the exhaust water mole fraction value is less than or equal to the partial pressure ratio value.

* * * * *